United States Patent
Fujii et al.

(10) Patent No.: US 8,373,916 B2
(45) Date of Patent: Feb. 12, 2013

(54) OPTICAL SCANNER AND IMAGE FORMING APPARATUS

(75) Inventors: Mitsumi Fujii, Iwate-ken (JP); Tetsurou Saitoh, Sendai (JP); Eiji Mochizuki, Machida (JP); Kohki Sasaki, Ichinoseki (JP)

(73) Assignee: Ricoh Company, Ltd., Tokyo (JP)

( * ) Notice: Subject to any disclaimer, the term of this patent is extended or adjusted under 35 U.S.C. 154(b) by 250 days.

(21) Appl. No.: 12/722,980

(22) Filed: Mar. 12, 2010

(65) Prior Publication Data
US 2010/0232833 A1 Sep. 16, 2010

(30) Foreign Application Priority Data

Mar. 16, 2009 (JP) ................. 2009-063394
Dec. 1, 2009 (JP) ................. 2009-273206

(51) Int. Cl.
*G02B 26/08* (2006.01)
(52) U.S. Cl. .................... 359/224.1; 359/904
(58) Field of Classification Search .... 359/198.1–199.4, 359/200.6–200.8, 202.1, 221.2, 223.1–225.1, 359/226.2, 904, 290–295, 838, 846, 871, 359/872; 250/204, 559.06, 559.29, 230, 250/234; 347/255–260; 353/39, 98–99; 385/15–18, 22; 398/12, 19, 45
See application file for complete search history.

(56) References Cited

U.S. PATENT DOCUMENTS

| 6,381,428 | B1* | 4/2002 | Yamamoto et al. | 399/116 |
| 6,678,493 | B2* | 1/2004 | Maeyama et al. | 399/302 |
| 2003/0090563 | A1* | 5/2003 | Tomita et al. | 347/245 |
| 2005/0093968 | A1* | 5/2005 | Iwamoto | 347/238 |
| 2008/0198433 | A1* | 8/2008 | Ueyama | 359/198 |

FOREIGN PATENT DOCUMENTS

| JP | 2981600 | 9/1999 |
| JP | 3584595 | 8/2004 |
| JP | 2005-128147 | 5/2005 |
| JP | 3740444 | 11/2005 |
| JP | 4012535 | 9/2007 |
| JP | 4390174 | 10/2009 |

* cited by examiner

*Primary Examiner* — Jennifer L. Doak
(74) *Attorney, Agent, or Firm* — Oblon, Spivak, McClelland, Maier & Neustadt, L.L.P.

(57) ABSTRACT

An optical scanner, including a frame member; a pair of connection members near a coupling end with the frame member; a pair of elastic members connected with the frame member by the connection members; a mirror substrate supported by the pair of elastic members, the mirror substrate having a bending rigidity outward from the rotational axis for each area in accordance with a bending moment caused by oscillation, the mirror substrate having a slit at both connection ends with the pair of elastic members; and a piezoelectric element provided on each of the connection members, the piezoelectric element generating a torque for driving the mirror substrate oscillatable back and forth around the pair of elastic members as a torsion rotational axis.

11 Claims, 21 Drawing Sheets

BENDING MOMENT Mx

BENDING MOMENT Mx (a)

(b)

PROCESS (1) : FORMING THERMALLY-OXIDIZED FILM

PROCESS (2) : LOWER ELECTRODE/PZT/UPPER ELECTRODE FILM FORMATION

PROCESS (3) : RESIST PATTERNING (PATTERN FOR UPPER ELECTRODE/PZT)

PROCESS (4) : UPPER ELECTRODE/PZT ETCHING

PROCESS (5) : RESIST PATTERNING (LOWER ELECTRODE/ PATTERN FOR THERMALLY-OXIDIZED FILM)

PROCESS (6) : LOWER ELECTRODE/THERMALLY-OXIDIZED FILM ETCHING

PROCESS (7) : MIRROR REFLECTION FILM FORMATION

PROCESS (8) : RESIST PATTERNING

PROCESS (9) : 1st Si ETCHING

PROCESS (10) : RESIST PATTERNING (PATTERN FOR OSCILLATION SPACE)

PROCESS (11) : THERMALLY-OXIDIZED FILM ETCHING

PROCESS (12) : 2nd-Si ETCHING (a)

(b)

(a)

(b)

(a)

(b)

OPTICAL SCANNER AND IMAGE FORMING APPARATUS

BACKGROUND OF THE INVENTION

1. Field of the Invention

The present invention relates to an optical scanner, and more particularly to an optical scanner in which a mirror substrate supported by a pair of torsion springs is oscillated thereby as a turning rotational axis.

2. Discussion of the Background

Optical scanners deflecting and scanning light beam such as a laser beam with a mirror member are widely used for optical instruments such as electrophotographic copiers, laser beam printers and barcode readers. In addition, they are used in displays scanning a laser beam and projecting an image as well. Particularly, the following optical scanners are disclosed as compact optical scanners.

An optical scanner using a piezoelectric element to drive a mirror member is known. Japanese published unexamined application No. 2005-128147 discloses an optical scanner in which two pairs of piezoelectric unimorph oscillation plates piezoelectric elements are formed on is connected to a mirror member and an antiphase AC voltage is applied to the piezoelectric elements of the two pairs of piezoelectric unimorph oscillation plates to oscillate the mirror member back and forth around a torsion spring as a rotational axis.

An optical scanner driving a mirror member with an electromagnetic force is known as well. For example, Japanese Patent No. 3584595 discloses an optical scanner (light deflection element) formed of a movable part supported by a pair of springs, including a mirror surface and a coil pattern, and an optical writer using the optical scanner such as laser printers. The movable part is located in a bias magnetic field with a permanent magnet and the coil pattern is energized to sinusoidally oscillate the movable part back and forth.

An optical scanner including a oscillator having two elastic deformation modes, i.e., a deflection deformation mode and a twist deformation mode and a mirror surface is known as well. The oscillator is oscillated with a resonance frequency of each mode and the mirror surface of the oscillator reflects a beam to scan. For example, Japanese Patent No. 2981600 discloses an optical scanner including a controller controlling a spring constant trimmer so that the resonance frequency of the oscillator can automatically be adjusted to a predetermined frequency.

As mentioned above, various optical scanners in which a microscopic mirror formed by micromachining technology is torsionally oscillated to scan have been introduced recently. For a conventional mechanical element needing high-speed operation, inertia thereof has been a large obstructive factor to the drive speed. Particularly, a mechanical element rotationally oscillating in a predetermined angle needs reducing inertial moment. Then, it is necessary not to decrease rigidity of the mechanical element. For this purpose, the mechanical element has a hollow structure and a reinforced member is fixed thereon.

A microscopic mirror used in optical scanners, which needs high functionality and compactness requires being high-speed drivable and having high rigidity. When the rigidity is insufficient, the mirror largely deflects by an inertial force generated with oscillation thereof. Such a dynamic deflection noticeably deteriorates chemical properties of reflected light from the mirror. The mirror typically has thicker thickness to have higher rigidity to decrease dynamic deflection.

However, an actuator used in the optical scanner has a very small operational (electrostatic, electromagnetic and piezoelectric) force. When the mirror has thicker thickness to decrease the dynamic deflection, the inertia becomes large and a deflection angle largely lowers with a small drive force of the actuator. Therefore, the inertial moment of the mirror needs to be small to enlarge the deflection angle.

Japanese Patent No. 3740444 discloses an optical deflector in which a movable plate has a thickness becoming smaller outward in stages to reduce the inertial moment.

As mentioned above, the microscopic mirror used in optical scanners, which needs high functionality and compactness requires being high-speed drivable and further having high rigidity to prevent itself from largely deflecting by an inertial force generated with oscillation of the mirror. The optical deflector disclosed in Japanese Patent No. 3740444 reduces the inertial moment, having a movable plate with a concave portion located far from its torsion axis so that the movable plate is formed of less silicone in weight. A concave portion is not formed near the torsion axis of the movable plate so as to increase its solid section. When torsionally oscillated, the larger bending moment is thought to be loaded on the movable plate and the solid section near the torsion axis is increased to keep rigidity of the movable plate.

However, it is required to further decrease weight of the oscillation plate to further reduce the inertial moment and dynamic deflection thereof when oscillating while keeping the rigidity thereof.

Because of these reasons, a need exists for reducing inertial moment and dynamic deflection of a mirror substrate included in an optical scanner.

SUMMARY OF THE INVENTION

Accordingly, an object of the present invention is to provide an optical scanner including a mirror substrate having low inertial moment and dynamic deflection.

Another object of the present invention is to provide an image forming apparatus including the optical scanner.

These objects and other objects of the present invention, either individually or collectively, have been satisfied by the discovery of an optical scanner, comprising:
a frame member;
a pair of connection members near a coupling end with the frame member;
a pair of elastic members connected with the frame member by the connection members;
a mirror substrate supported by the pair of elastic members, the mirror substrate having a bending rigidity outward from the rotational axis for each area in accordance with a bending moment caused by oscillation, the mirror substrate having a slit at both connection ends with the pair of elastic members; and
a piezoelectric element provided on each of the connection members, the piezoelectric element generating a torque for driving the mirror substrate oscillatable back and forth around the pair of elastic members as a torsion rotational axis.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1:
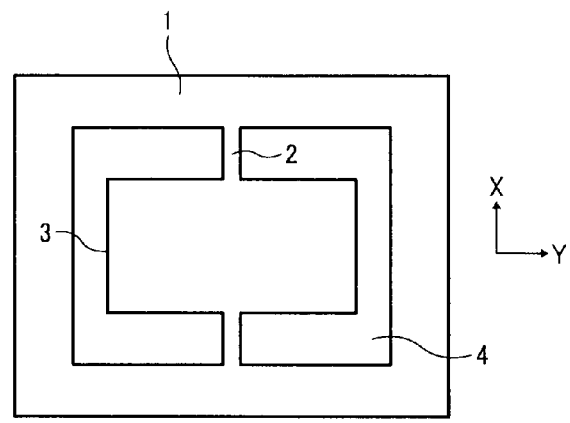
FIG. 1 is a schematic view illustrating a configuration of an optical scanner including a mirror substrate 3 being a simple rectangular parallelepiped.

The present invention provides an optical scanner including a mirror substrate having low inertial moment and dynamic deflection. More particularly, the present invention provides an optical scanner, comprising:

a frame member;

a pair of connection members near a coupling end with the frame member;

a pair of elastic members connected with the frame member by the connection members;

a mirror substrate supported by the pair of elastic members, the mirror substrate having a bending rigidity outward from the rotational axis for each area in accordance with a bending moment caused by oscillation, the mirror substrate having a slit at both connection ends with the pair of elastic members; and a piezoelectric element provided on each of the connection members, the piezoelectric element generating a torque for driving the mirror substrate oscillatable back and forth around the pair of elastic members as a torsion rotational axis.

Hereinafter, a preferred embodiment of the present invention will be explained in detail, referring to the drawings. The following Example is a preferred embodiment of the present invention and has various technical limitations, but the present invention is not particularly limited with the following descriptions and all the descriptions are not essential for the present invention.

[Dynamic Deformation]

First, dynamic deformation such as a bending moment and a dynamic deflection amount of an oscillation plate (a mirror substrate) formed on one side of a mirror member when it is a simple rectangular parallelepiped will be explained. The mirror substrate of the present invention has a structure in consideration of dynamic deformation mentioned below.

FIG. 1 is a schematic view illustrating a configuration of an optical scanner when including a mirror member having a simple rectangular parallelepiped oscillation plate (a mirror substrate 3) formed on one side thereof. In FIG. 1, numeral 1 is a substrate (frame member). 2 is a rotational axis formed of a beam, 3 is a mirror substrate formed on the substrate 1 and 4 is a space.

A metallic thin film having a sufficient reflectivity to light used is formed on one side of the mirror substrate 3 as a mirror surface, and light entering the mirror surface can be deflected. The mirror substrate 3 sinusoidally and rotationally oscillates around the rotational axis 2. The mirror substrate 3 oscillates to generate an inertial force. The inertial force applies a bending moment Mx to each point of the mirror substrate 3.

Figure 2:
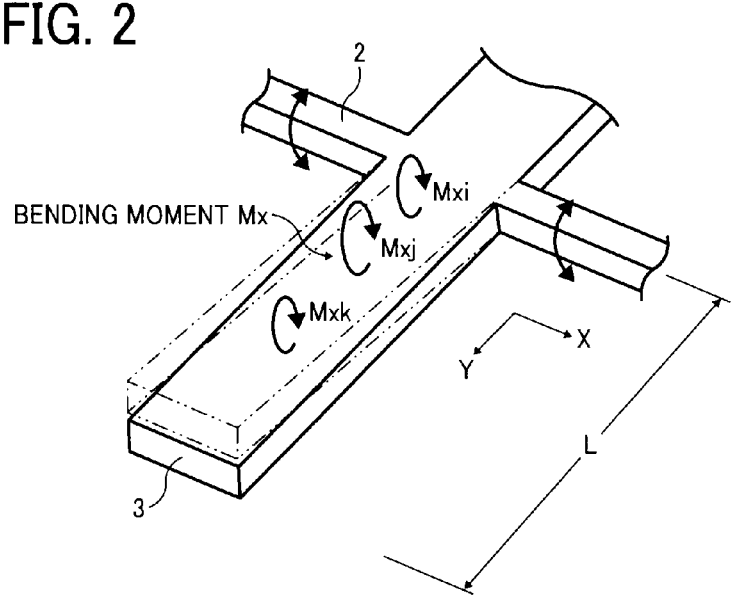
FIG. 2 is a schematic view showing a bending moment Mx applied to each point of the mirror substrate 3.
Figure 3:
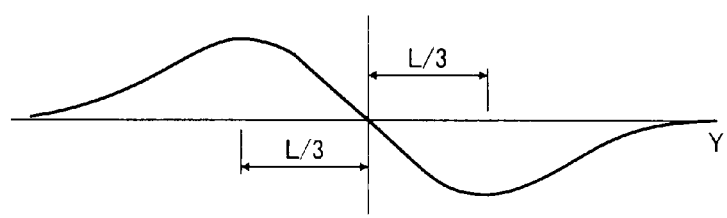
FIG. 3 is a diagram showing a result of computing the bending moment Mx.

FIG. 2 is a schematic view showing a bending moment Mx applied to each point of the mirror substrate 3. FIG. 3 is a diagram showing a result of computing the bending moment Mx. The bending moment Mx has a peak position at about ±L/3 when the mirror substrate 3 has a length of L in a Y-axis direction.

Figure 4:
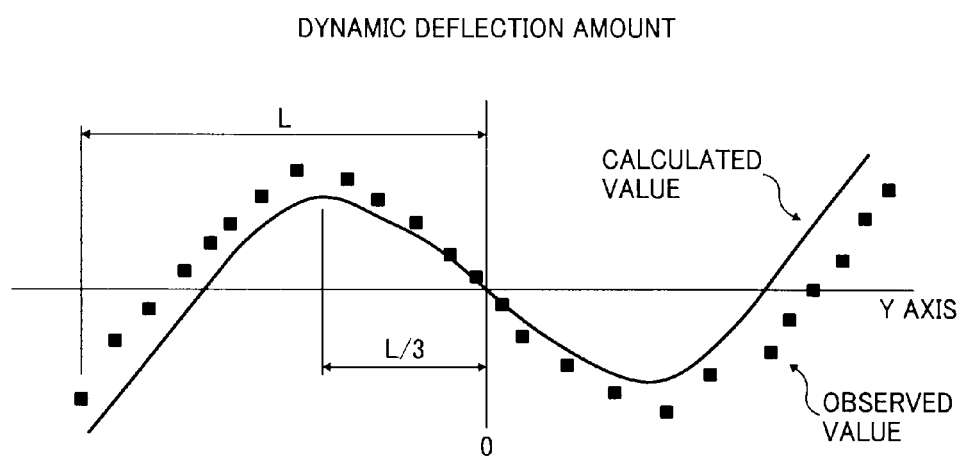
FIG. 4 is a diagram showing a computational result (a continuous line) and an observation result (black dot) of dynamic deflection.
Figure 5:
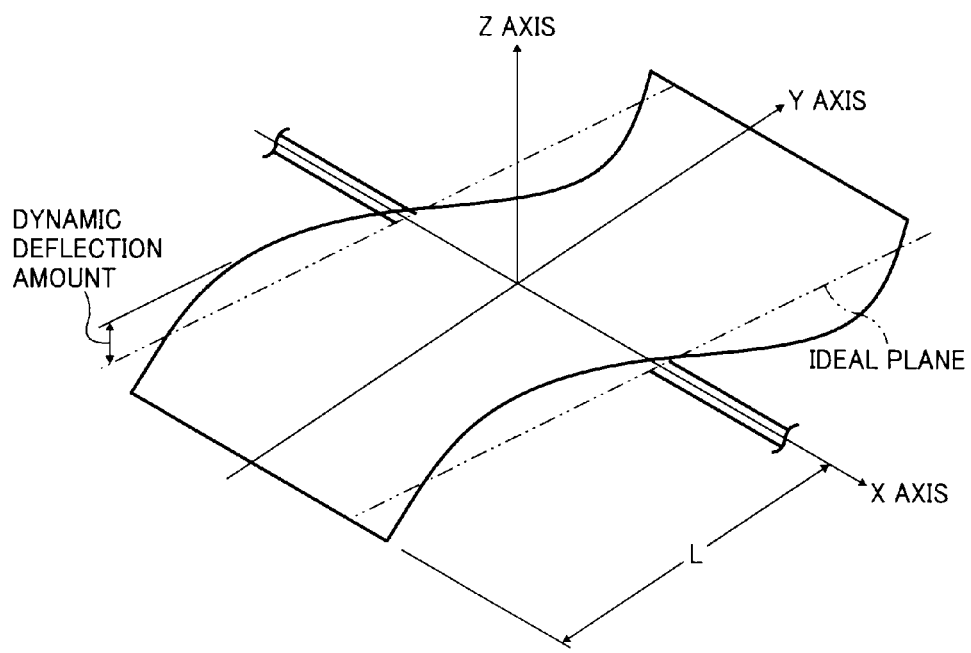
FIG. 5 is a schematic view illustrating a dynamic deformation of the mirror substrate 3.

The mirror substrate 3 was actually oscillated to measure deformation thereof and the results are shown in FIG. 4. FIG. 4 is a diagram showing a computational result (a continuous line) and an observation result (black dot) of dynamic deflection. The computational result was determined by numerical computation. The observation result was determined by holography method. The mirror substrate 3 almost sinusoidally oscillates and deflects in a waveform as shown in FIG. 4. The dynamic deflection amount is a difference between an ideal plane determined by method of least squares from a curved surface of the deformed mirror substrate 3 and the curved surface thereof as shown in FIG. 5. The maximum deflection amount is obtained at about L/3 when the mirror substrate has a length of L in a Y-axis direction (Ref. FIG. 4). FIG. 4 shows the deformation peal position is at ±L/3. A point the mirror substrate 3 deforms most is a site the bending moment is maximum.

EXAMPLE 1

Figure 6:
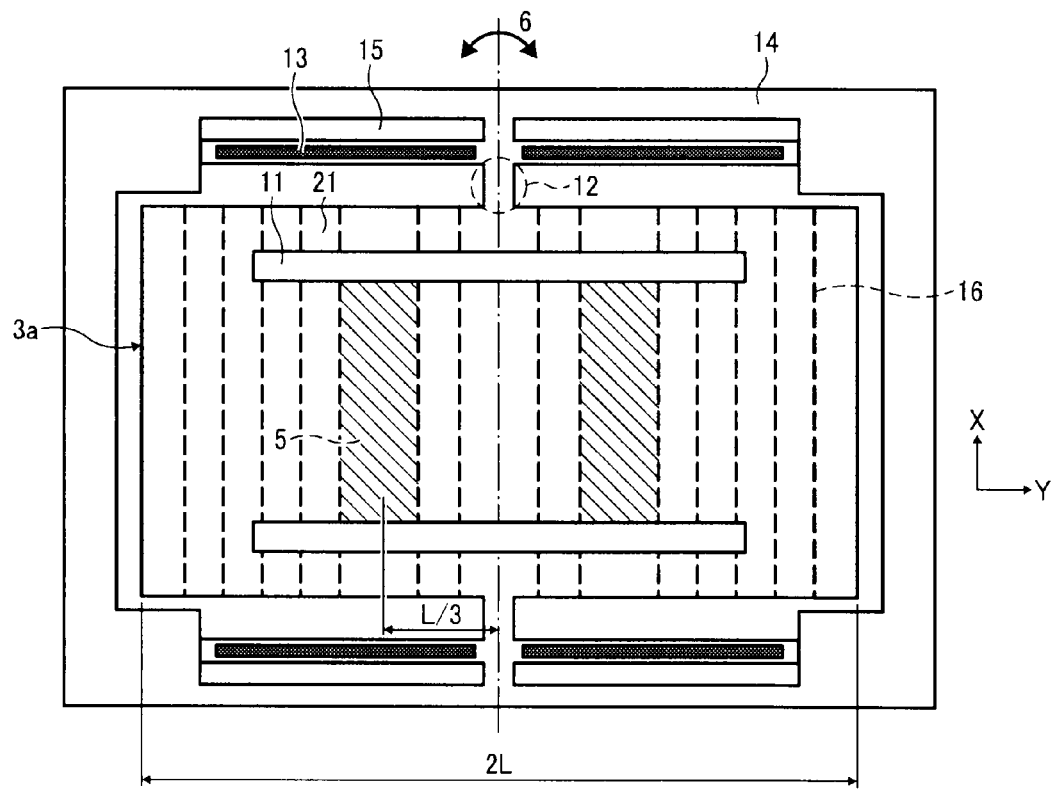
FIG. 6 is a schematic view illustrating an embodiment of the mirror substrate 3a of the present invention.

FIG. 6 is a schematic view illustrating an embodiment of the mirror substrate 3a of the present invention. The mirror substrate 3a of the present invention is supported by a pair of torsion springs 12. A rectangular slit 11 is formed on an end (supported by the torsion spring) of the mirror substrate 3a. A supporting member 21 is located between the torsion spring 12 and the slit 11. The torsion spring is used as an example of elastic members.

Each torsion spring 12 is fixed by a pair of connection members 15 near a connection end with a frame member 14. The pair of connection members 15 includes a piezoelectric element 13 generating a torque for driving the mirror substrate 3a. The mirror substrate 3a oscillates when driven by the piezoelectric element 13 to deflect incident light.

The mirror substrate 3a rotates around an axis (6) supported by the pair of torsion springs 12 as a rotational axis. A dotted line 16 on the mirror substrate 3a shows allocations of a bending rigidity distribution. A diagonal area 5 including a point at which the bending moment is maximum needs to have a maximum bending rigidity. The bending moment was determined as follows.

Figure 7:
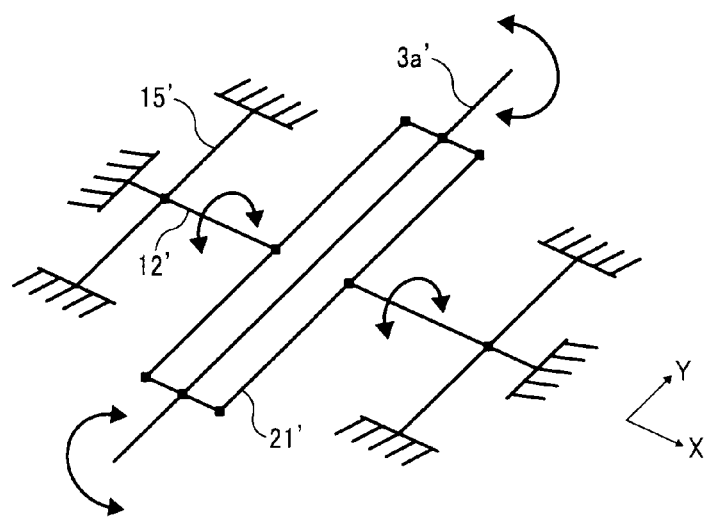
FIG. 7 is a schematic view illustrating a model for determining a bending moment of the mirror substrate 3a of the present invention.

FIG. 7 is a schematic view illustrating a model for determining a bending moment of the mirror substrate 3a of the present invention. Each member is modeled with a beam element and the bending moment is determined by finite-element method.

Figure 8:
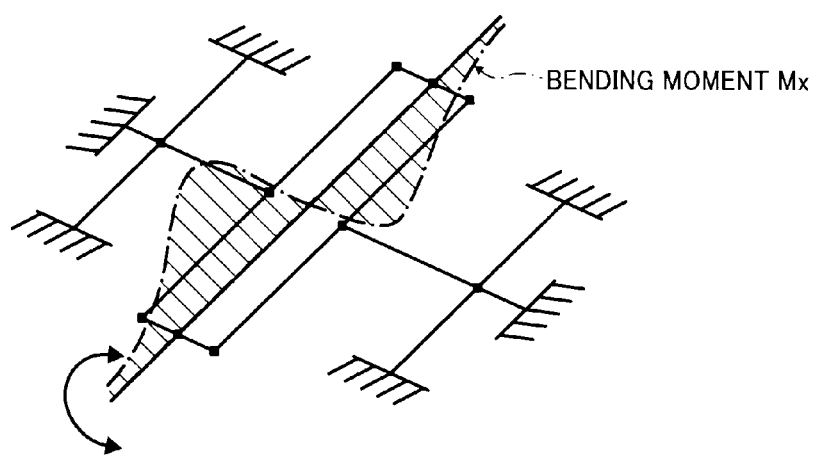
FIG. 8 is a schematic view showing a computational result of the bending moment of the mirror substrate 3a of the present invention.
Figure 9:
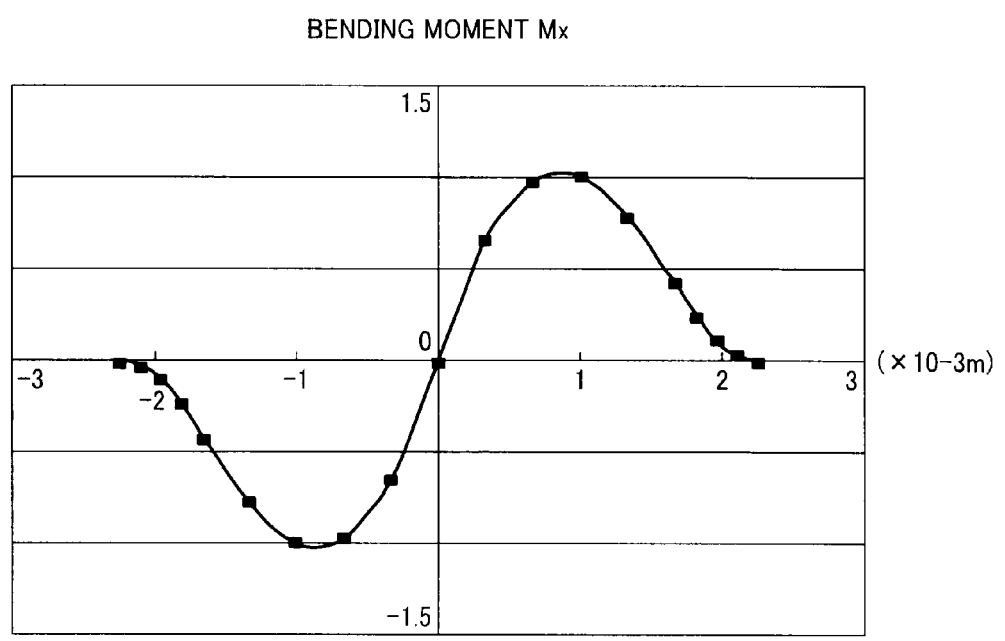
FIG. 9 is a diagram showing the computational result of the bending moment of the mirror substrate 3a of the present invention.

In FIG. 7, a mirror substrate 3a' is supported by a pair of torsion springs 12'. A slit 11 formed on the mirror substrate 3a represents 21 as a beam 21' as a supporting member. Each torsion spring 12' is fixed by a pair of connection members 15' near a connection end with a frame member 14. FIGS. 8 and 9 are a schematic view and a diagram, respectively, showing a computational result of the bending moment of the mirror substrate 3a of the present invention. Thus, as shown in FIG. 6, the determined bending moment is equally divided in a Y-axis direction and a bending moment of each divided area is determined. Based on the determined stepwise bending moments, bending rigidities are allotted to correspondent areas of the mirror substrate 3a.

Figure 10:
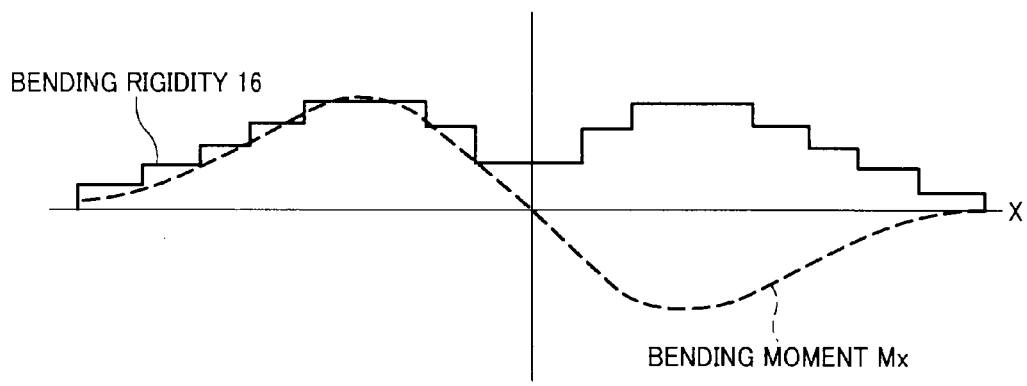
FIG. 10 is a diagram showing a bending rigidity distribution 16 allotted on the mirror substrate of the present invention.

The bending rigidity distribution 16 allotted is shown in FIG. 10. FIG. 10 is a diagram showing a relation between a bending moment and a bending rigidity of the mirror substrate 3a of the present invention. Therefore, a mirror substrate having a maximum bending rigidity at about a center position between the rotational axis (Numeral 6 in FIG. 6) and an end thereof has less bending moment and less dynamic deflection amount.

Namely, in the present invention, the mirror substrate 3a has a maximum rigidity at an area 5 including a point ±L/3 at which the mirror substrate 3a has a maximum bending moment. A dynamic deflection amount δ is determined by the following formula (1) when a maximum bending moment making a bending rigidity so as to realize the bending rigidity distribution 16 in FIG. 10 is Max and a bending rigidity of the operating point is EI:

$$\delta \propto Mmax/EI \qquad (1)$$

wherein E is Young's modulus and I is a second moment of area.

In an area from a torsion beam (rotational axis, numeral 6 in FIG. 6) to an end of the mirror substrate 3a (in Y direction), a maximum bending rigidity is allotted to a point on which a maximum bending moment is applied to decrease the dynamic deflection represented by the formula (1). The bending moment and the bending rigidity are almost fixed at every point.

EXAMPLE 2

Figure 11:
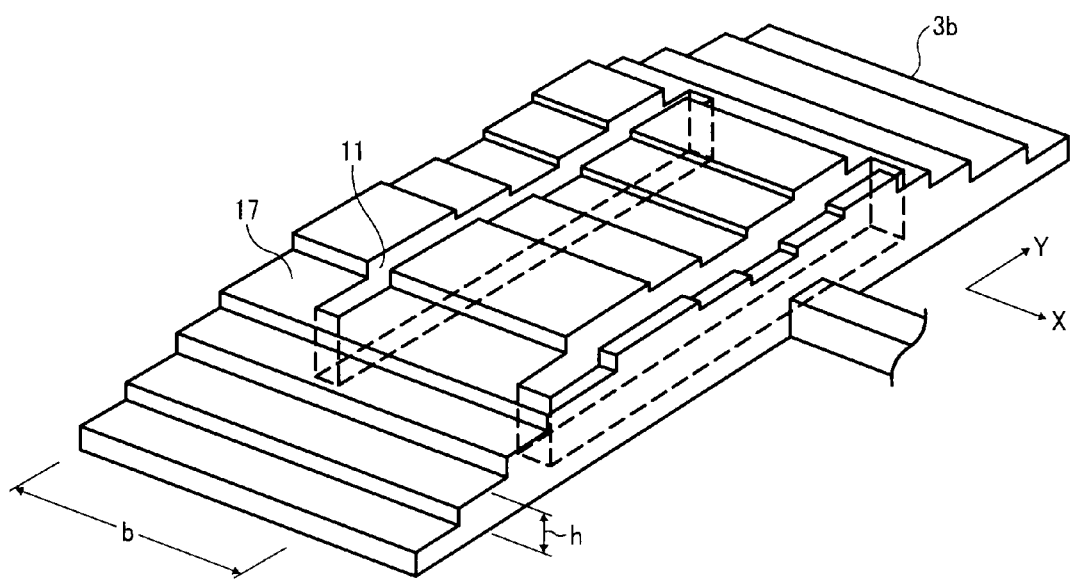
FIG. 11 is a schematic view illustrating another embodiment of the mirror substrate 3b of the present invention.

FIG. 11 is a schematic view illustrating another embodiment of the mirror substrate 3b of the present invention. The mirror substrate 3b has stepwise plural areas 17 on the backside (the opposite side of a side a mirror member is formed on (mirror side) so as to realize the bending rigidity distribution 16 in FIG. 10.

The stepwise plural areas 17 are formed of a silicone member. Further, a slit 11 is formed on the mirror substrate 3b.

A second moment of area I×j in each area j17 of the mirror substrate 3b in FIG. 11 is determined by the following formula:

$$I \times j = bh^3/12$$

wherein b and h are a width and a thickness of each area of the mirror substrate 3b, respectively.

A dynamic deflection δ in each area j of the mirror substrate 3b when a bending moment in each area j of the stepwise areas in FIG. 11 is M×j is determined by the following formula:

$$\delta = k \cdot M \times j / I \times j$$

wherein k is a proportional constant.

The thickness h is changed so that the dynamic deflections amount in each area of the mirror substrate 3b are almost same to determine a second moment of area I×x of each area. Namely, a ratio of the second moment of area I×j to a bending moment M×j made when the mirror substrate oscillates is mostly constant.

Ribs in the following Examples 3 to 5 are convexities having various shapes on the backside of the bottom plate (mirror surface).

EXAMPLE 3

Figure 12:
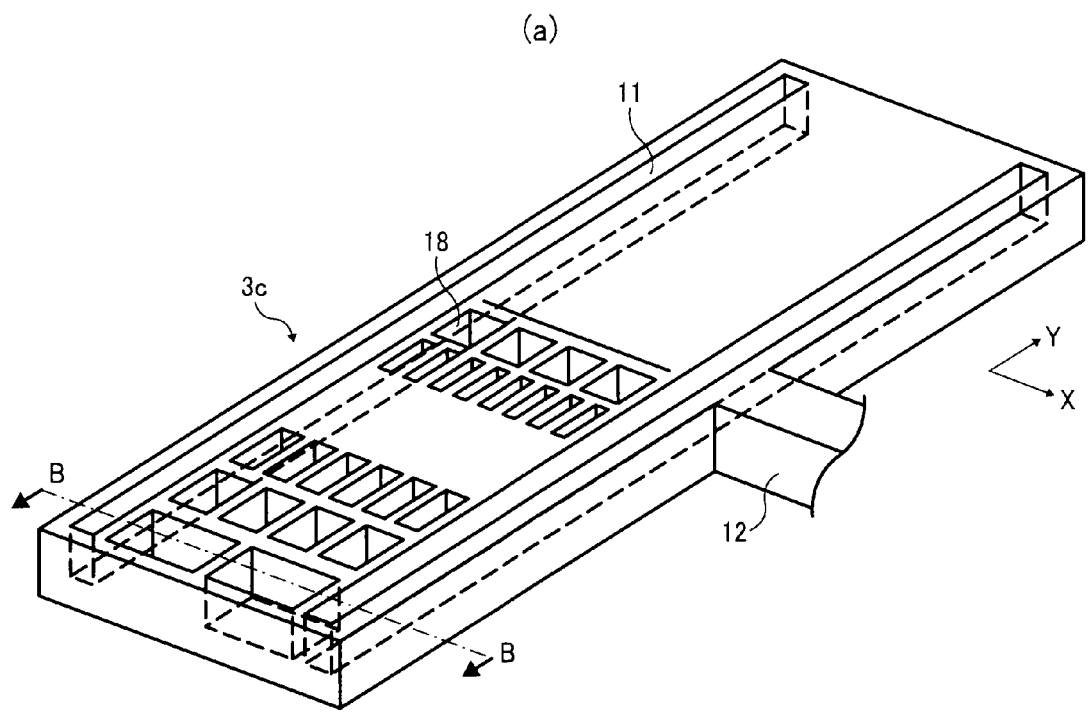
FIGS. 12A and 12B are schematic views illustrating a further embodiment of the mirror substrate 3c of the present invention.
Figure 12:
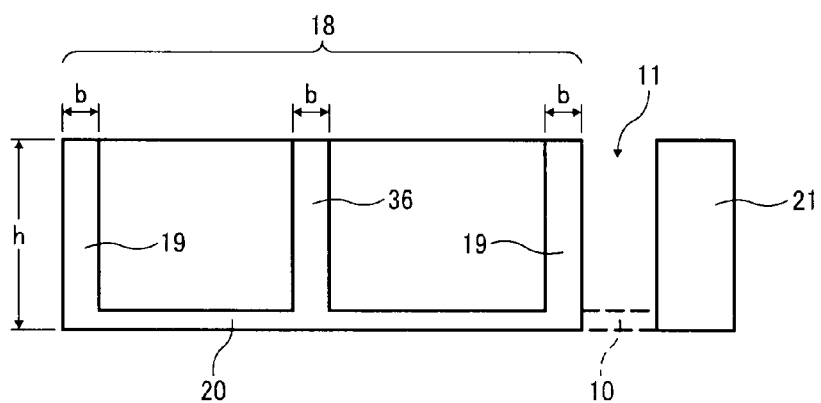

FIGS. 12A and 12B are schematic views illustrating a further embodiment of the mirror substrate 3c of the present invention. As shown in FIG. 12A, the mirror substrate 3c has plural concavities 18 on the backside. Further, rectangular slits 11 are formed at ends of both sides of the mirror. The plural concavities 18 are formed of a silicone member.

FIG. 12B is a cross-section B-B of the mirror substrate 3c. The plural concavities 18 are formed of plural ribs 19 and a bottom plate 20. The slit 11 preferably penetrates, but may have a thin-walled portion at the bottom surface.

The sizes of the concavities 18 of each area j are different from each other so as to realize the bending rigidity distribution 16 shown in FIG. 10. A second moment of area in each area of the mirror substrate 3c is Ix. The cross-section B-B of the mirror substrate 3c is divided into each rectangular rib 18 to determine a second moment of area. The bottom plate 20 is so thin that its second moment of area can be disregarded. The second moment of area is a sum of the second moments of area of ribs and can be determined by the following formula:

$$Ix = \Sigma bh^3/12.$$

The second moment of area can be controlled by controlling the number of ribs 19.

When a bending moment in each area in FIG. 10 is Mx, a sum δ of dynamic deflection amounts in each area of the mirror substrate 3c can be determined by the following formula:

$$\delta = k\Sigma Mx/Ix.$$

The second moment of area in each area Ix is fixed so that dynamic reflection amounts in each area of the mirror substrate 3 are almost equal. Thus, Mx/Ix is mostly constant in each area and all the deflection amounts δ almost linearly increase, which decreases the dynamic deflection amount.

EXAMPLE 4

Figure 13:
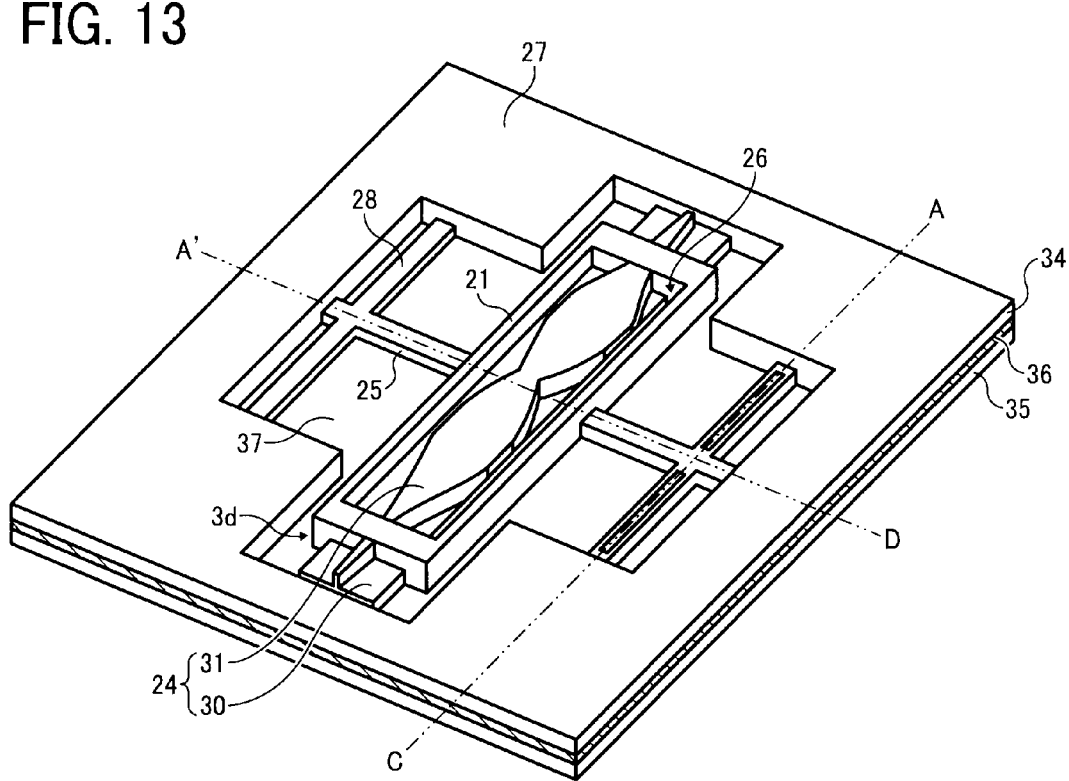
FIG. 13 is a schematic view illustrating another embodiment of the mirror substrate 3d of the present invention.

FIG. 13 is a schematic view illustrating another embodiment of the mirror substrate 3d of the present invention. The mirror substrate 3d is supported by a pair of torsion springs 25, and each of the torsion springs 25 is fixed by a pair of connection members 28 near its connection end with a frame member 27. A piezoelectric element 29 generating a torque for driving the mirror substrate 3d when deformed is formed on the backside (mirror surface side deflecting incident light) of the connection member 28. Further, a slit 26 is formed on the mirror substrate 3d, and a beam 21 is formed.

Further, a mirror member 24 which is a mirror surface deflecting incident light is formed of a thin-walled portion 30 and a rib 31 extending to an end of the mirror member on the backside thereof. The thin-walled portion 30 has a thickness of tens of μm, a second moment of area of the member can be disregarded.

When the rib has a width of b, second moment of areas in each point can be determined by the following formula as well:

$$Ix = bh^3/12.$$

The rib width is changed so that a ratio of the second moment of areas in each point to a bending moment made at each point in FIG. 10 is almost fixed (a height h is fixed).

Thus, Mx/Ix is mostly constant in each area and all the deflection amounts δ almost linearly increase, which decreases the dynamic deflection amount.

<Effect of Slit>

Figure 27:
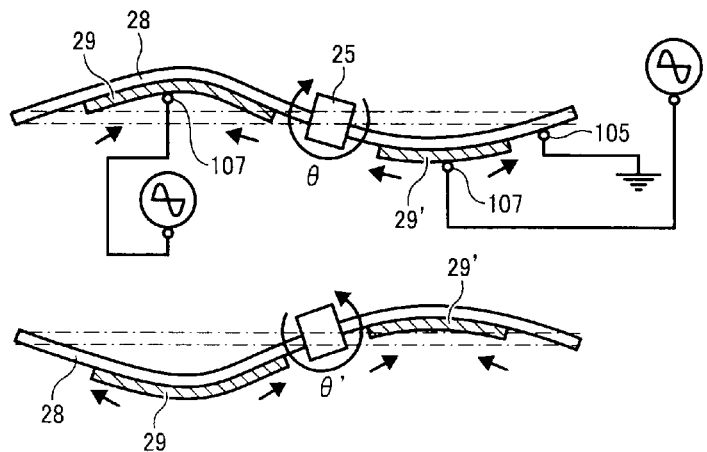
FIG. 27 is a schematic view for explaining a torque T applied to the torsion spring 25 of the present invention.
Figure 31:
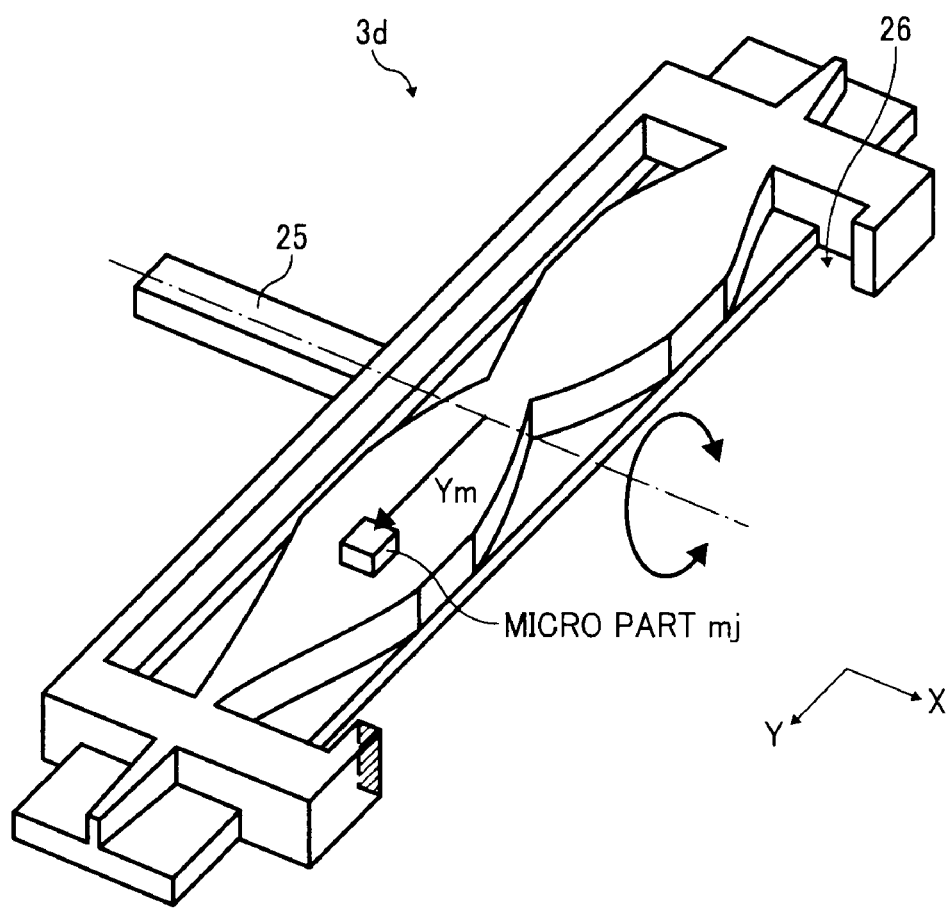
FIG. 31 is a schematic view for explaining a relation between a slit 26 formed on the mirror substrate 3d of the present invention and reduction of the dynamic deformation.

A rectangular slit 26 is formed on the mirror substrate 3d along a side of a torsion spring connection end. The rectangular slit is extended close to both ends of the mirror substrate in the longitudinal direction, which maximizes a bending rigidity of an area including a position where a bending moment made when the mirror substrate oscillates is maximum. A relation between the slit 26 formed on the mirror substrate 3d and a reduction of dynamic deformation will be explained. First, the mirror substrate is divided into microscopic portions mj to investigate a barycentric position when the mirror substrate 3d rotationally oscillates around a center of a torsion spring 25 (Ref. FIGS. 27 and 31). A barycenter Yg in a Y-axis direction of the mirror substrate when having a total weight M can be determined by the following formulae:

$$\Sigma mj = M$$

$$\Sigma mj*yj = M*Yg$$

$$Yg = (\Sigma mj*yj)/M$$

The barycentric position Yg is near an end of the mirror in the longitudinal direction. Therefore, the slit makes a point connected with the mirror near the barycentric position Yg to further reduce dynamic deformation.

MODIFIED EXAMPLE OF EXAMPLE 4

Figure 14:
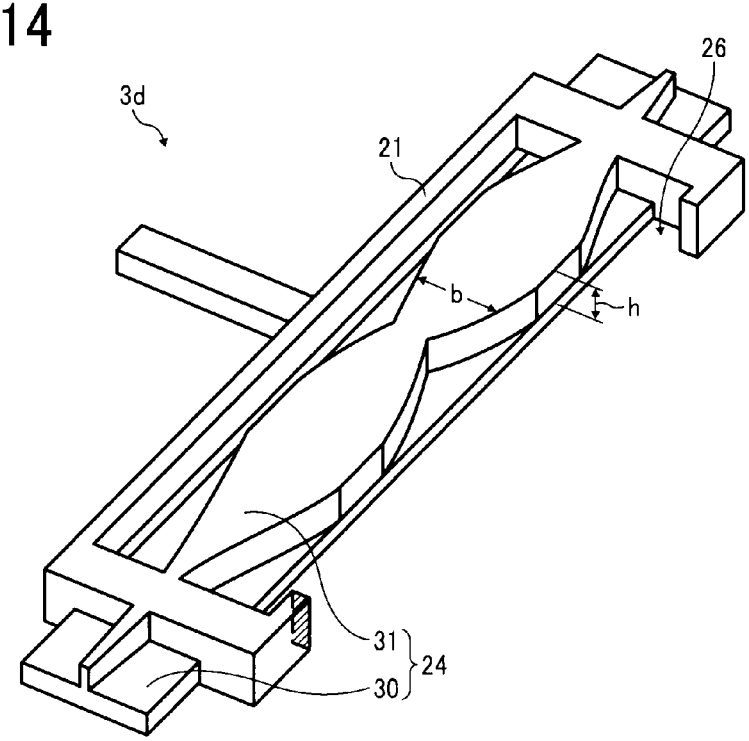
FIG. 14 is another schematic view illustrating the mirror substrate 3d of the present invention.
Figure 15:
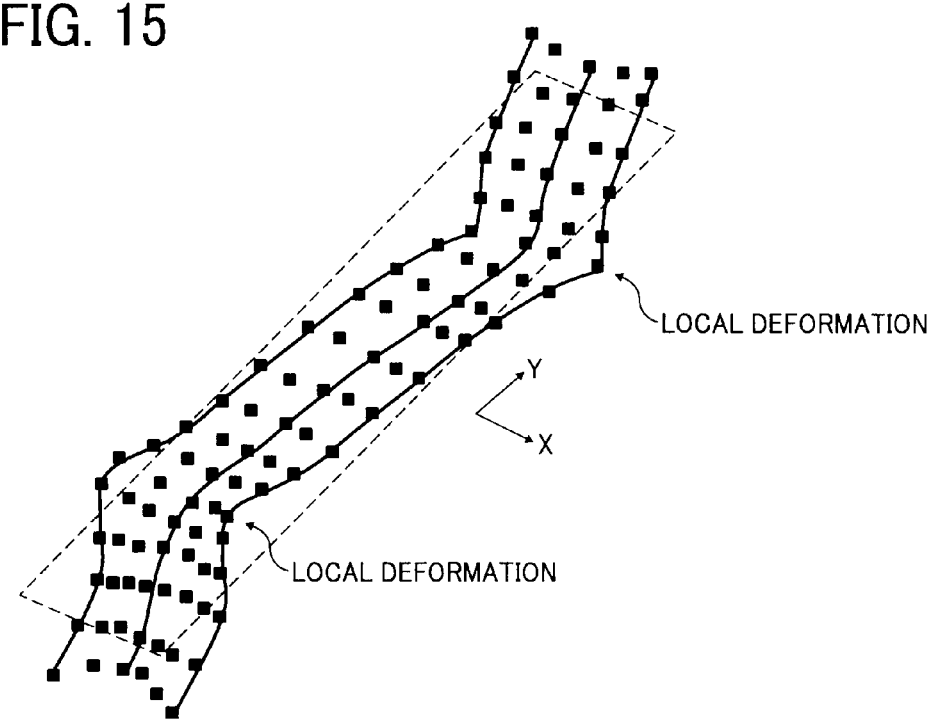
FIG. 15 is a schematic view showing a computational result of dynamic deformation of the mirror substrate 3d of the present invention.

FIG. 15 is a computational result of dynamic deformation of the deflection mirror in Example 4. FIG. 15 is a schematic view showing a dynamic deformation of the whole mirror substrate 3d. In FIG. 15, the mirror has local deformations near the ends of a mirror member 24 and a slit 26 in a shorter side direction. As shown FIGS. 13 and 14, the beam 21 separated by the slit 26 from the mirror substrate 3d is connected with the rib 31. Therefore, it is thought that the second moment of area quickly changes to cause a local deformation.

Figure 16:
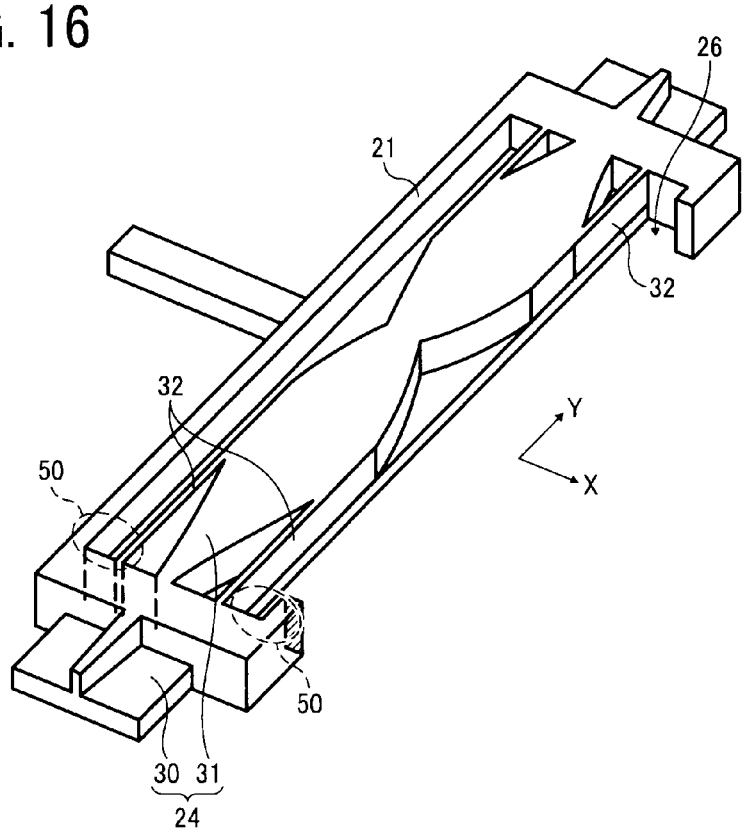
FIG. 16 is a schematic view illustrating a modified example of the mirror substrate 3d of the present invention.
Figure 17:
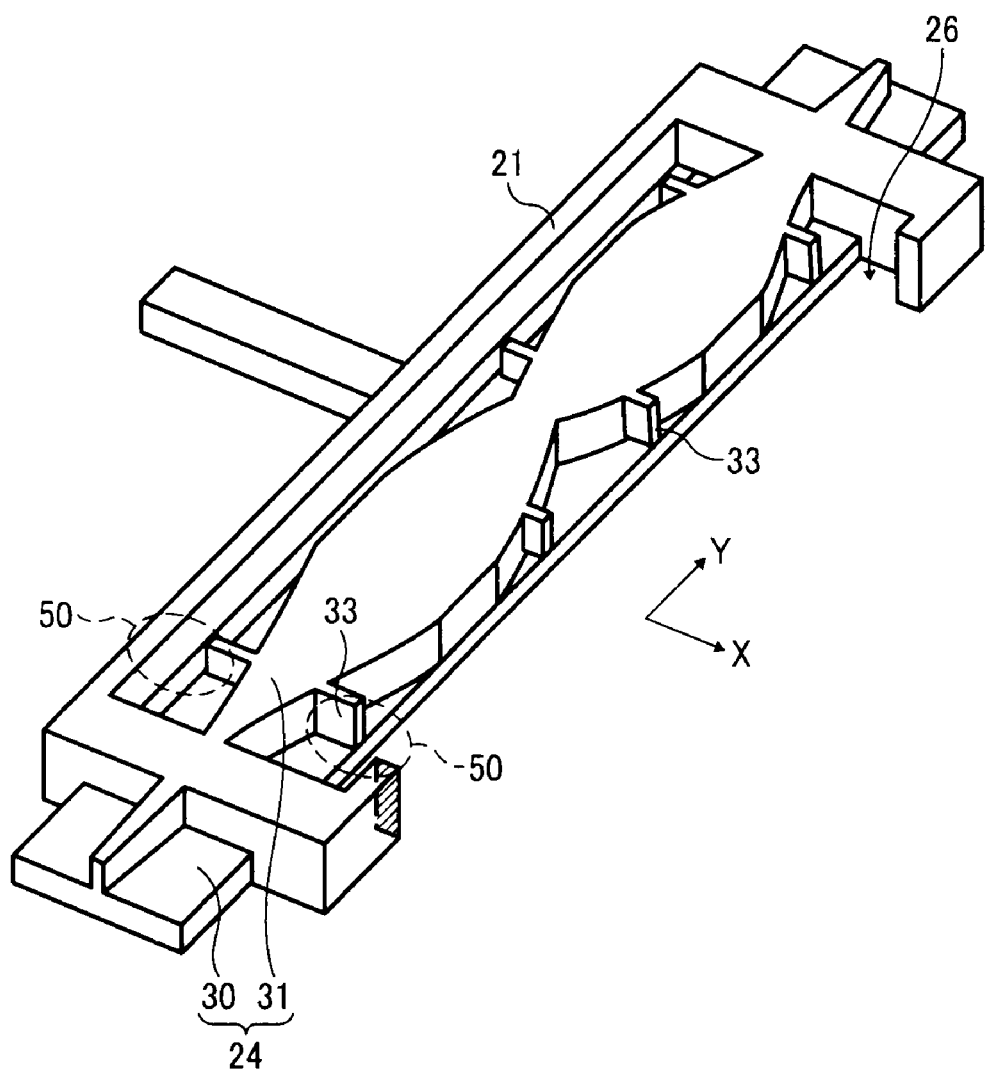
FIG. 17 is a schematic view illustrating another modified example of the mirror substrate 3d of the present invention.

A rib 32 extending in a y-axis direction (FIG. 16) or a rib 33 extending in an x-axis direction (FIG. 17) near a connection point 50 between the mirror member 24 and the beam 21 can be thought. The rib 32 extending in a y-axis direction or the rib 33 extending in an x-axis direction can reduce the quick change of the second moment of area, which can prevent the local deformation.

Figure 18:
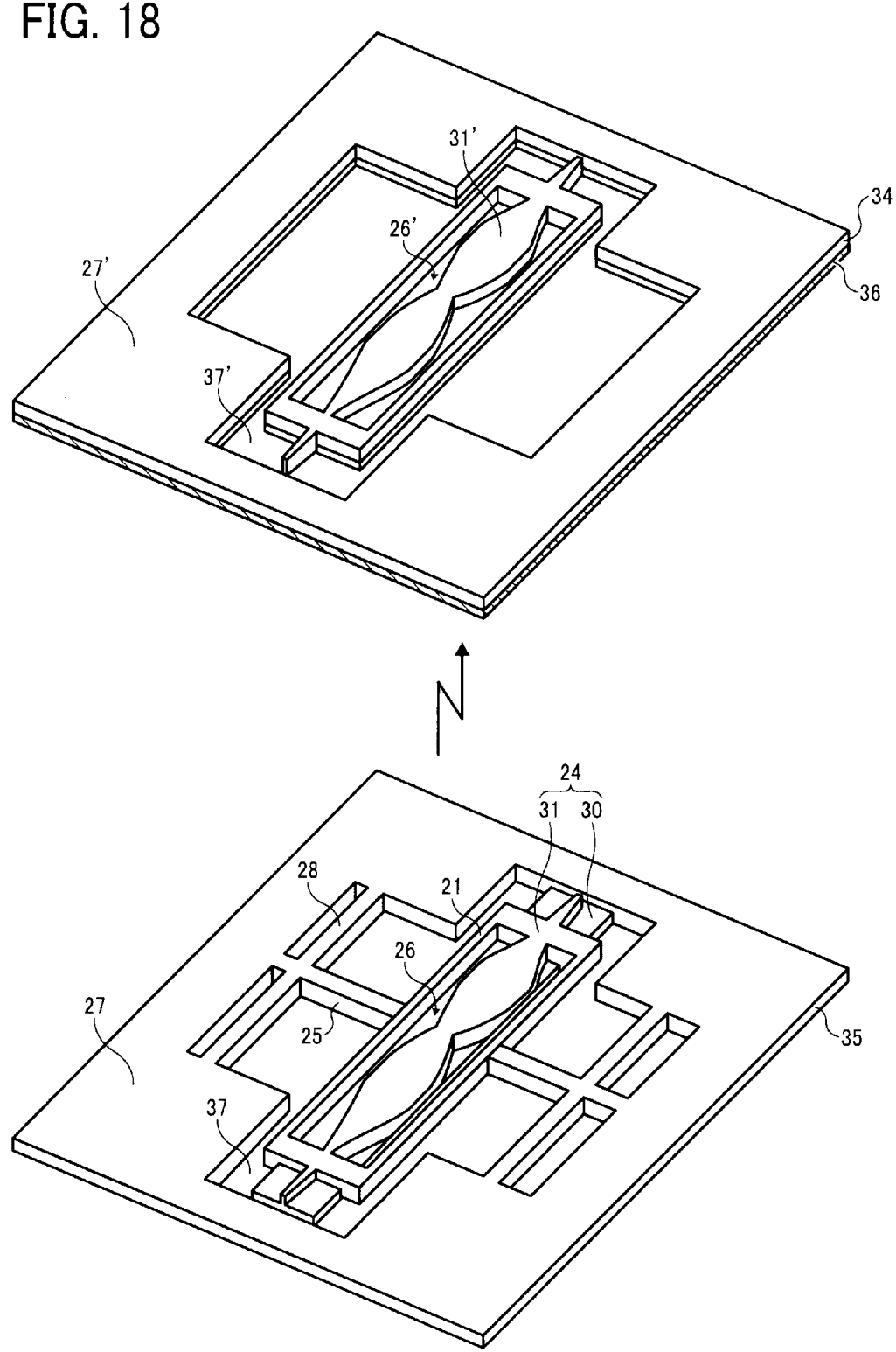
FIG. 18 is a schematic view for explaining configuration of the mirror substrate 3d of the present invention.

Next, a preparation process of Example 4 will be explained. As shown in FIGS. 18A and 18B, Example 4 is formed of a SOI (Silicon on Insulator) substrate in which a first silicon substrate 35 and a second silicon substrate 34 are combined through an insulating film 36. A torsion spring 25 is formed on the first silicon substrate 35. A mirror member 24 formed of a thin-walled portion 30 and a rib 31 is formed on the same first silicon substrate 35. A frame member 27, a rib 31 of the mirror member 24 and a connection member 28 are formed penetrating through the first substrate and the second substrate. An oscillation space 37 of the mirror member and the slit 26 are formed in a body.

Figure 19:
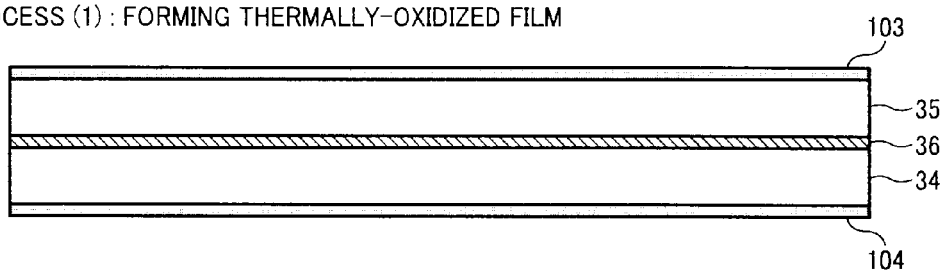
FIG. 19 is a schematic view for explaining a process of forming the mirror substrate 3d of the present invention.
Figure 19:
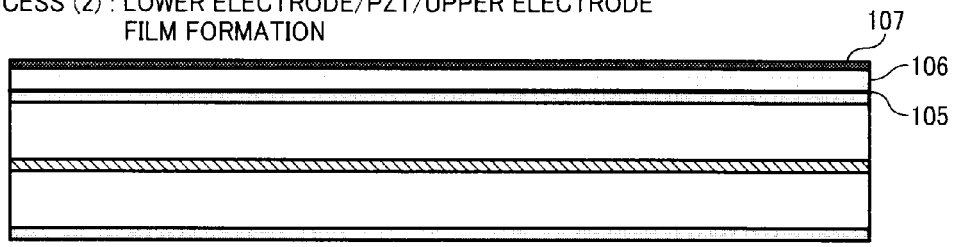
Figure 19:
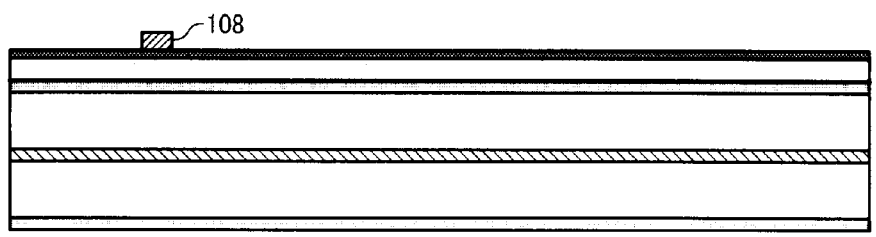
Figure 19:
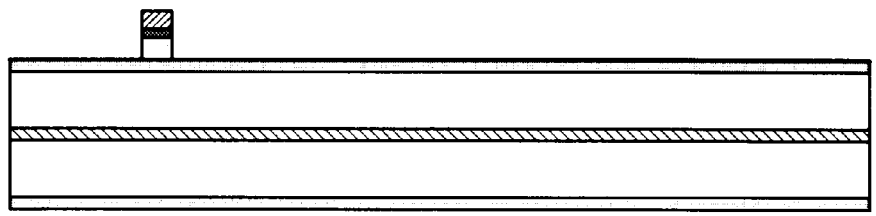
Figure 19:
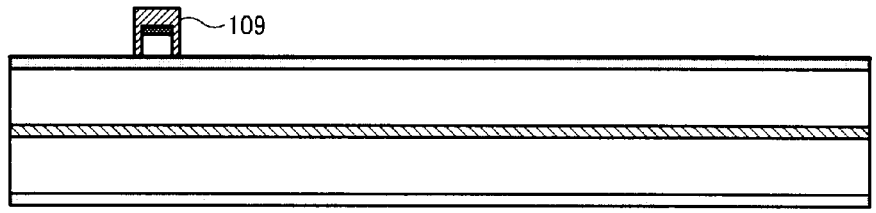
Figure 20:
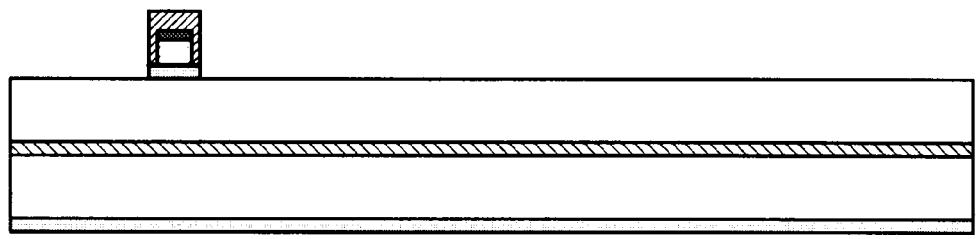
FIG. 20 is a schematic view for explaining another process of forming the mirror substrate 3d of the present invention.
Figure 20:
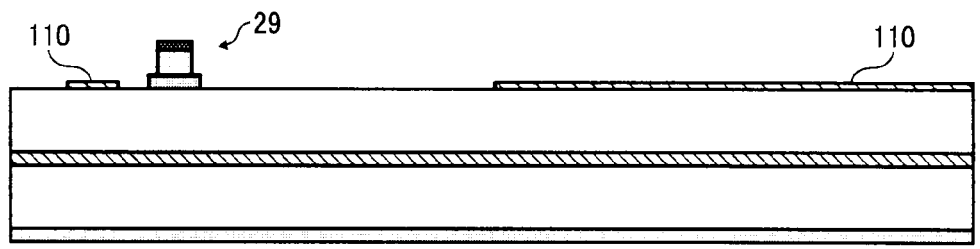
Figure 20:
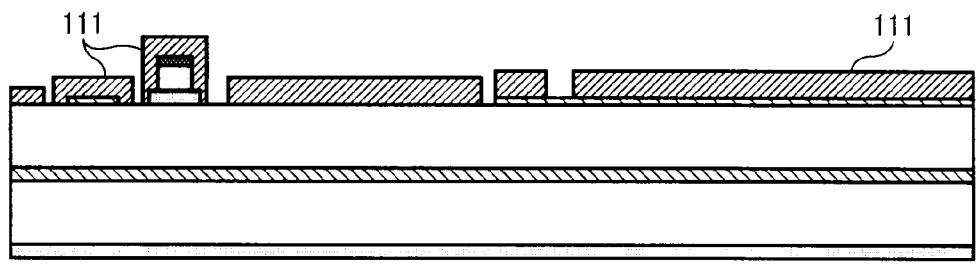
Figure 20:
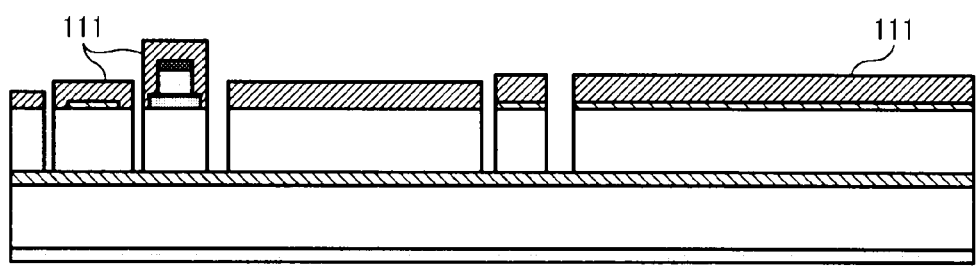
Figure 21:
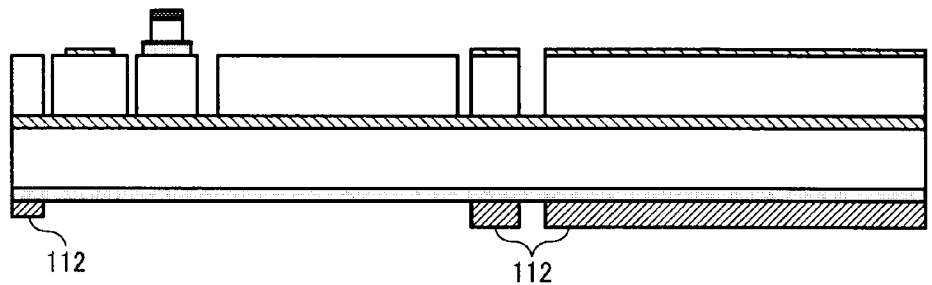
FIG. 21 is a schematic view for explaining a further process of forming the mirror substrate 3d of the present invention.
Figure 21:
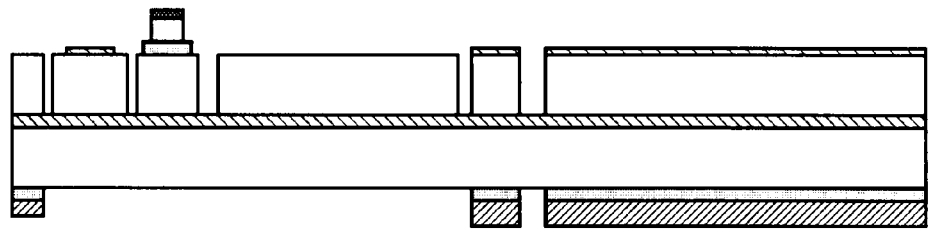
Figure 21:
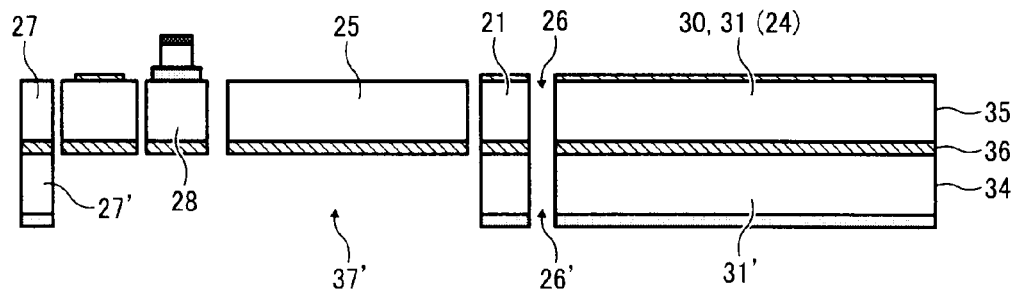

A preparation method will be explained for more clarifying the above-mentioned structure and materials. FIGS. 19 to 21 are schematic views for explaining processes of forming the mirror substrate. They are cross-sections corresponding to the cross-sections A-D in FIG. 13, from the frame member 27 to the center of the mirror member 24.

Process (1): On the surface of the SOI (Silicon on Insulator) substrate in which a first Si substrate 35 and a second Si substrate 34 are combined through an insulating film 36, thermally-oxidized films 103 and 104 having a thickness, e.g., of 0.5 μm are formed. The first Si substrate 35 is a low-resistance substrate (conductive), and does not particularly include a metal and combines an electrode.

Process (2): On the first Si substrate 35, a lower electrode film 105 for a piezoelectric element 29 for generating drive torque, a piezoelectric material film 106 extending and contracting in the longitudinal direction of a connection member 28 and an upper electrode film 107 are formed in this order.

The lower electrode film 105 is formed of a 0.05 μm thick Ti film and a 0.15 μm thick Pt film in this order. The piezoelectric material film 106 is a 3 μm thick zirconate titanate (PZT) film. The upper electrode film 107 is a 0.15 μm thick Pt film. The lower and upper electrode films can be formed by sputtering methods. The piezoelectric material film can be formed by sputtering methods, CVD (Chemical Vapor Deposition) methods, ion plating methods, etc.

Process (3): A resist pattern 108 is formed for dry etching the upper electrode film 107 and the piezoelectric material film 106.

Process (4): The upper electrode film 107 and the piezoelectric material film 106 are subjected to dry etching by RIE (Reactive Ion Etching), and then the resist is removed.

Process (5): A resist pattern 109 is formed for dry etching the lower electrode film 105 and the thermally-oxidized film 103.

Process (6): The lower electrode film 105 and the thermally-oxidized film 103 are subjected to dry etching by RIE (Reactive Ion Etching), and then the resist is removed. Thus, a piezoelectric element 29 is formed.

Process (7): A reflection film 110 is formed as a mirror surface of the mirror member 24. Specifically, e.g., a 0.05 µm thick Ti film, a 0.05 µm thick Pt film and 0.1 µm thick Au film are formed in this order. These films are formed by sputtering methods using a stencil mask.

Process (8): A resist pattern 111 is formed for dry etching the mirror member 24, the slit 26, the torsion spring 25 and the connection member 28.

Process (9): The resist pattern 111 is subjected to dry etching by RIE, and then the resist is removed. Thus, the mirror member 24, the slit 26, the torsion spring 25 and the connection member 28 are patterned to an insulation layer 101 of the SOI substrate.

Process (10): On the thermally-oxidized film 104 of the second Si substrate 34 of the SOI substrate, a resist pattern 112 is formed for dry etching an oscillation space 37' of the mirror substrate 3.

Processes (11) and (12): The thermally-oxidized film 104 is subjected to dry etching by RIE, and then the second Si substrate 34 and the insulating film 36 is subjected to dry etching by RIE. Thus, an optical scanner including the mirror substrate 3d in Example 4 is completed.

EXAMPLE 5

Figure 22:
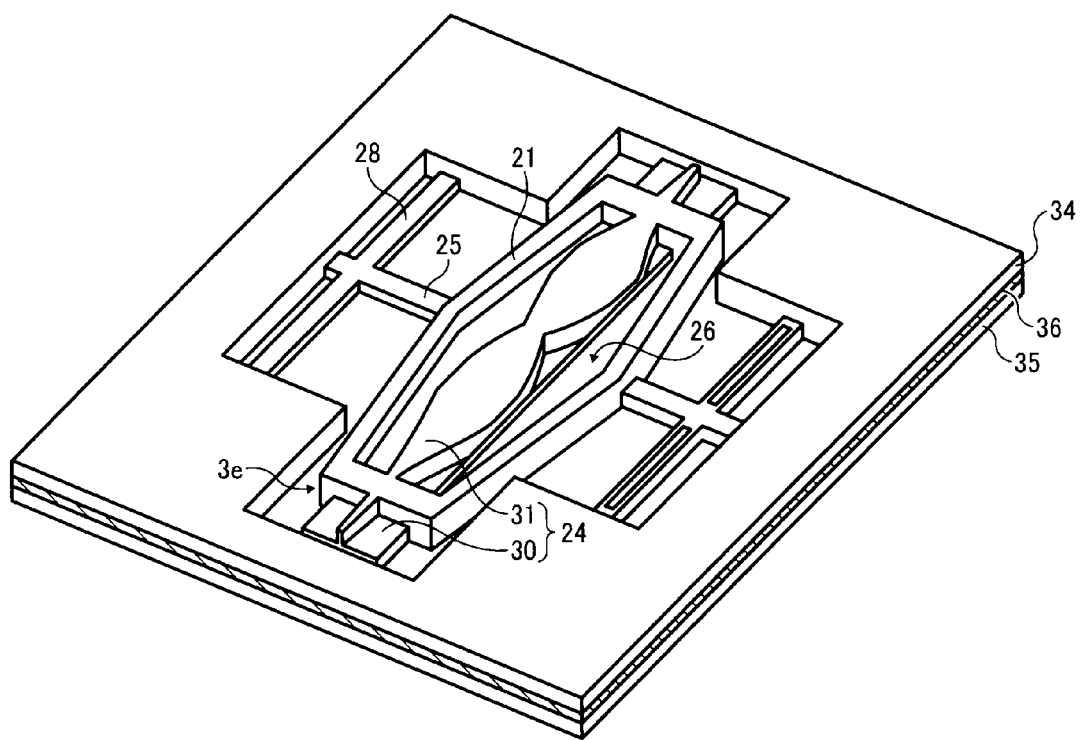
FIG. 22 is a schematic view illustrating a further embodiment of the mirror substrate 3e of the present invention.

FIG. 22 is a schematic view illustrating a further embodiment of the mirror substrate 3e of the present invention. The slit 26 is almost triangularly shaped to form a Y-shaped beam 21. The other constitutions are same as those of Example 4.

In order to see an effect of a rigidity distribution of the mirror substrate in Example 4, dynamic deflections of the mirror member 24 including the rib 31 based on the rigidity distribution and a rectangular mirror member were compared. Simulated results are shown in rectangular standard.

When a dynamic deflection amount of the rectangular mirror member is 1 and an inertial moment thereof is 1, the rib-shaped mirror substrate in Example 4 has a dynamic deflection amount of 0.5 and an inertial moment of 0.7. Both of the dynamic deflection amount and the inertial moment are reduced as shown in Table 1.

TABLE 1

|  | Dynamic Deflection | Inertial Moment |
| --- | --- | --- |
| Rectangular parallelpiped | 1 | 1 |
| Example 4 | 0.5 | 0.7 |

Figure 25:
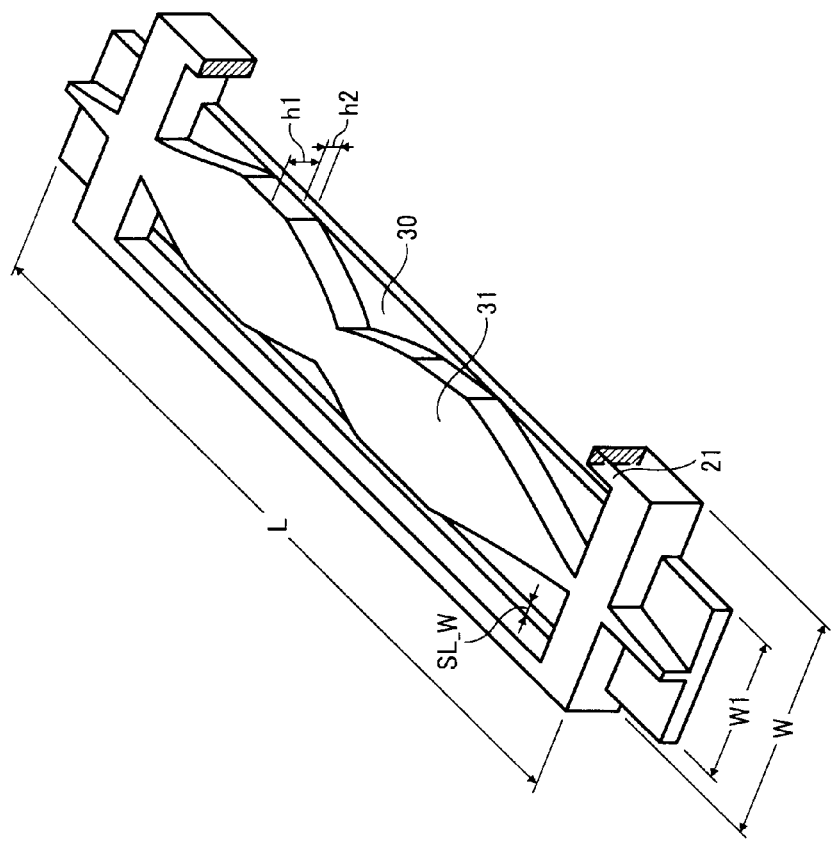
FIG. 25 is a schematic view illustrating an outline of a comparative rectangular parallelepiped mirror substrate.

In order to see the effect of the rigidity distribution of the mirror substrate in Example 4 more specifically, dynamic deflections of the mirror member 24 including the rib 31 based on the rigidity distribution and the almost rectangular parallelepiped mirror substrate in FIG. 25 were compared.

Figure 23:
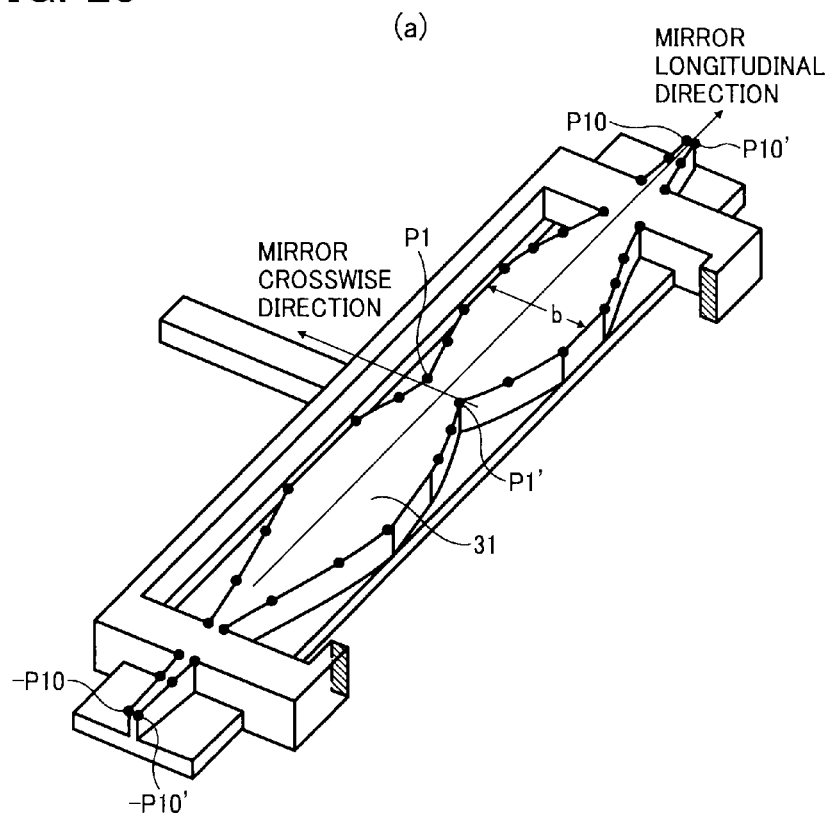
FIGS. 23A and 23B are a schematic view and a diagram showing a form and a size of a rib of the mirror substrate 3d of the present invention, respectively.
Figure 23:
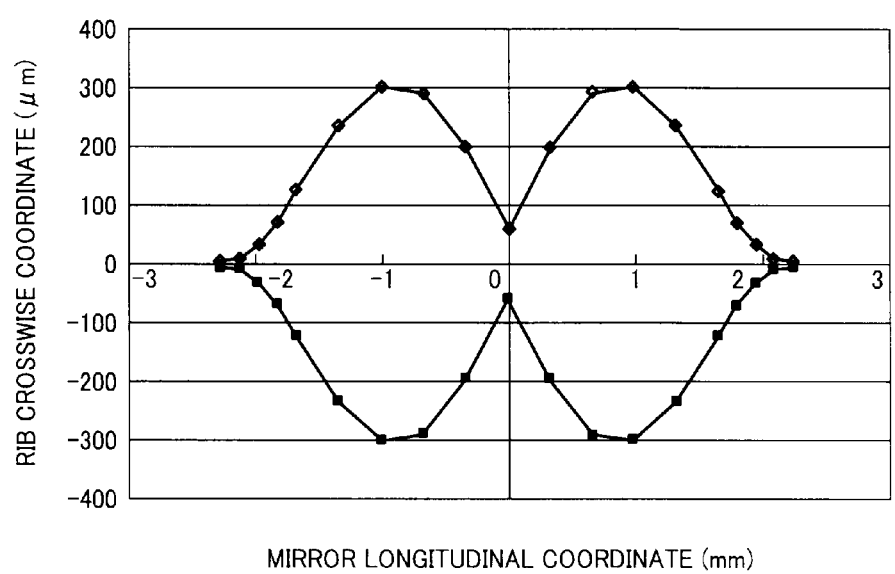

FIGS. 23A and 23B are a schematic view and a diagram showing a form and a size of a rib of the mirror substrate 3d of Example 4. In FIG. 23, the rib shape is defined by points P1 to P10, and each of the points are symmetric relative to a longitudinal and a shorter side direction of the mirror. The rib 31 has a width b defined by P1 to P10, P1' to P10', −P1 to −P10 and −P1' to −P10' in a shorter side direction.

Figure 24:
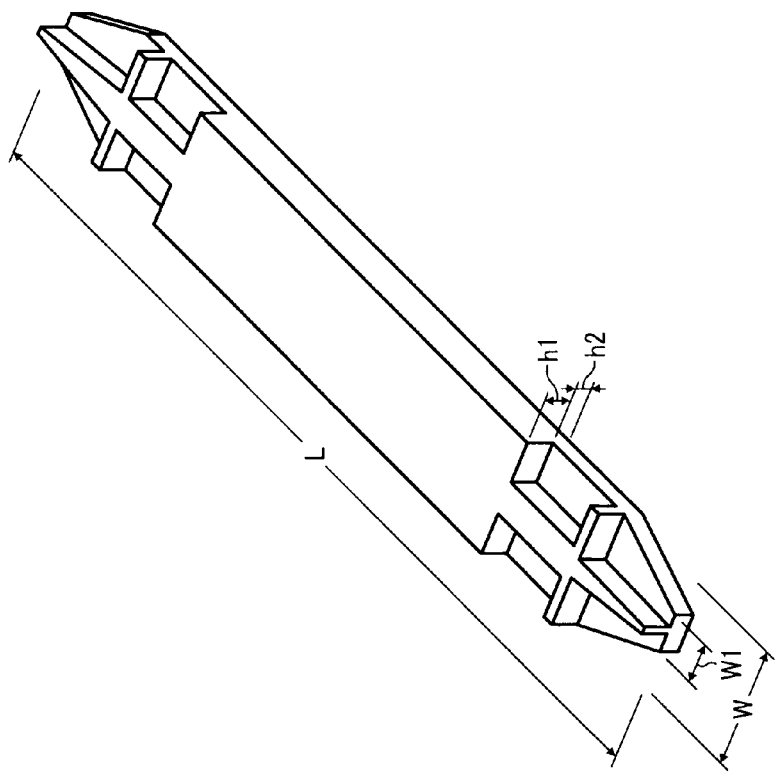
FIG. 24 is a schematic view illustrating an outline of the mirror substrate 3d of the present invention.

FIG. 24 is a schematic view illustrating an outline of the mirror substrate 3d in Example 4. In FIG. 24, the mirror has an outline having a length L of 4.5 mm, a width W1 of 0.6 mm, a width W including a support member 21 of 1 mm, a slit width SL_W of 0.14 mm, and has a mirror member having a thin-walled portion thickness h2 of 50 µm and a rib 31 thickness h1 of 350 µm. A dynamic deflection of the mirror was computed. A resonance frequency was 3.04 kHz and the dynamic deformation was 22 nm (pV) at a deflection angle of 12d (deg).

As a comparative example, a dynamic deformation of the almost rectangular parallelepiped mirror substrate in FIG. 25 was determined. In FIG. 25, the mirror has an outline having a length L of 4.5 mm, a width W of 1 mm, an end width of 0.4 mm, and has a mirror member having a thin-walled portion thickness h2 of 50 µm and a rib 31 thickness h1 of 350 µm. A dynamic deflection of the mirror was computed. A resonance frequency was 2.922 kHz and the dynamic deformation was 46 nm (pV) at a deflection angle of 12d (deg).

Figure 26:
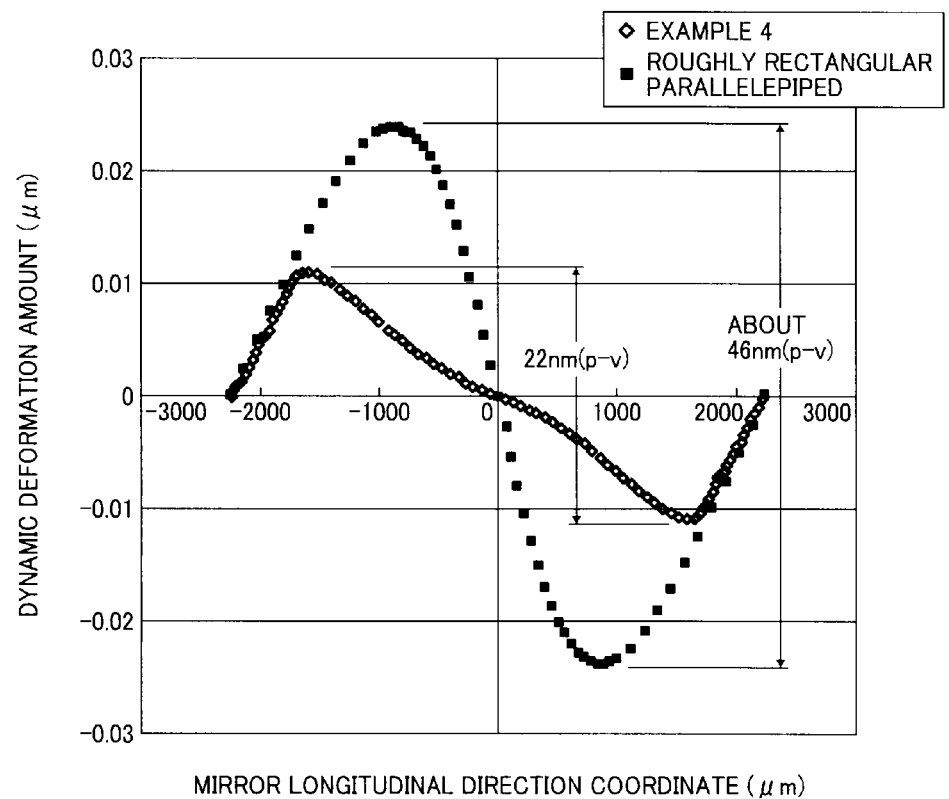
FIG. 26 is a diagram showing dynamic deformation volumes of the mirror substrate 3d of the present invention and the comparative rectangular parallelepiped mirror substrate.

The results are shown in FIG. 26. Inertial moments determined at the same time are shown in Table 2.

TABLE 2

| Rib Shape | Dynamic Deformation (nm, PV) | Inertial Moment (Kg·m^2) |
| --- | --- | --- |
| Almost Rectangular Parallelepiped | 46 | $3.22 \times 10^{-12}$ |
| Example 4 | 22 | $2.8 \times 10^{-12}$ |

When a dynamic deflection amount of the rectangular parallelepiped mirror member island an inertial moment thereof is 1, the rib-shaped mirror substrate in Example 4 has a dynamic deflection amount of ½ and an inertial moment of 0.8. Both of the dynamic deflection amount and the inertial moment are reduced as shown in Table 2.

A torque T applied to the torsion spring 25 will be explained referring to FIG. 27 (an A-C cross-section in FIG. 13). A piezoelectric member is formed on an undersurface of the connection member 28, and a lower electrode 105 is connected with a GND. A negative voltage is applied to an upper electrode 107 and a positive voltage is applied to the other upper electrode 107'.

A piezoelectric element 29 contracts in an arrow direction and a piezoelectric element 29' extends in an arrow direction. The connection member 28 formed of a silicon substrate neither extends nor contracts. Therefore, the connection member 28 bends and deforms, and causes a torsion θ in an arrow direction.

A reverse voltage is applied to the upper electrodes 107 and 107' respectively, a reverse extension and contraction are caused respectively. The torsion spring 25 has a torsion angle θ' in an arrow direction. Sinusoidal voltages each having a different phase by 180° from each other are applied to the electrodes 107 and 107' respectively to cause a resonant oscillation.

In the mirror substrate of the present invention, since each of portions from a rotational axis to an end of the mirror substrate has almost a fixed ratio of bending rigidity to bending moment, the dynamic deflection and inertial moment can be reduced.

Figure 28:
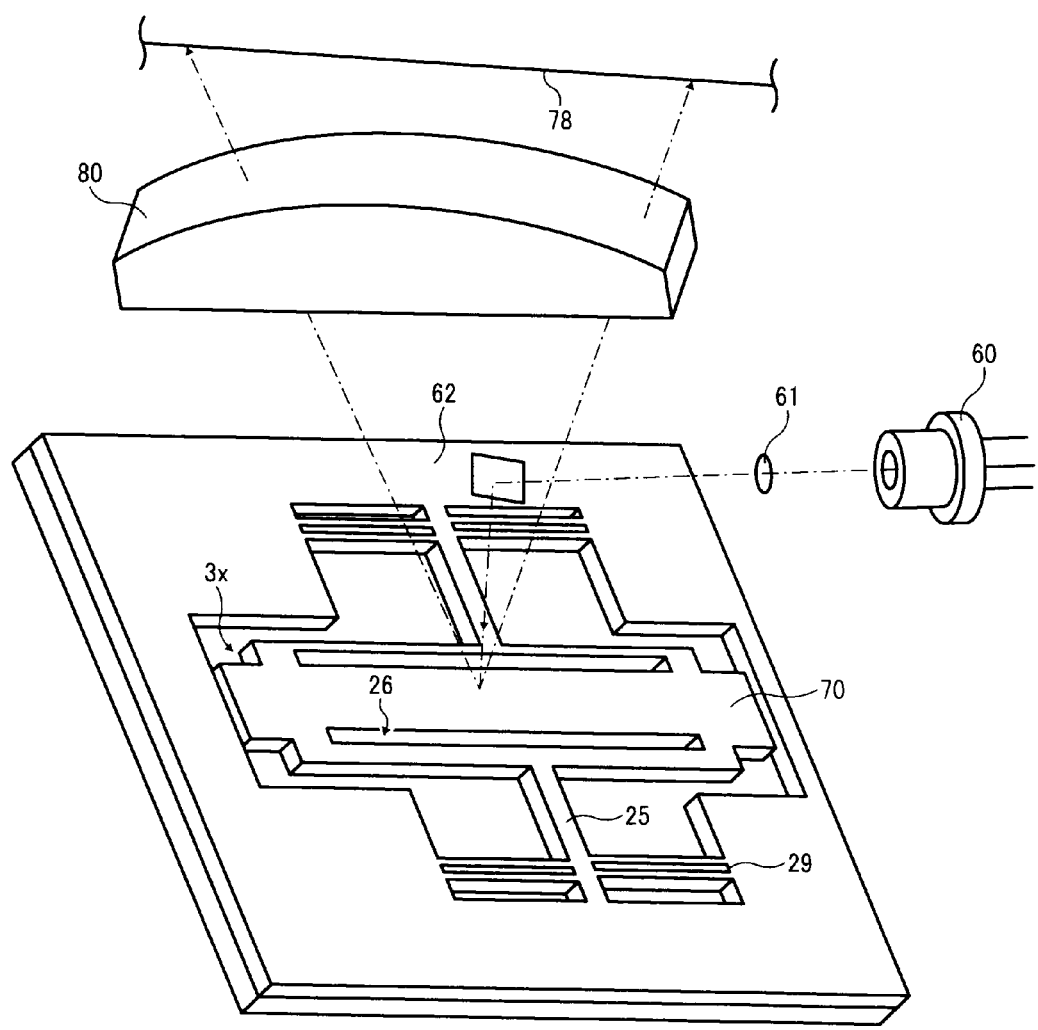
FIG. 28 is a schematic view illustrating an optical writer including the mirror substrate of the present invention.

FIG. 28 is a schematic view illustrating the optical scanner of the present invention. In FIG. 28, numeral 60 is a light source formed of a laser diode. A laser beam from the light source 60 is formed to almost parallel light by a collimated lens 61. A return mirror 62 makes the laser beam enter a mirror surface 70 of a mirror substrate 3x.

The mirror substrate 3x resonantly oscillates with deformation of the piezoelectric element 29 through the torsion spring 25, i.e., the mirror substrate 3x oscillates back and forth around the torsion spring 25 as a rotational axis. A laser beam having entered the mirror substrate 3x oscillating as just described is deflected by a mirror 70 and enters an adjustment optical system 80 such as an fθ lens. The laser beam coming out from the adjustment optical system 80 forms an image on a surface to be scanned 78.

The shape of a beam formed on the surface of the mirror 70 is an oval having a size of approximate 4 mm in a longitudinal direction of the mirror and 500 μm in a shorter side direction thereof. Even when the slit 26 is formed through the mirror substrate 3x, a distance between the both slits 26 is longer than a shorter diameter of the beam to normally deflect the beam.

The mirror substrate 3x has any one of constitutions of Examples 1 to 5 to reduce dynamic deformation (deflection). Therefore, the optical scanner of the present invention can improve optical properties such as a beam diameter of a beam forming an image on a surface to be scanned.

EXAMPLE 6

Figure 30:
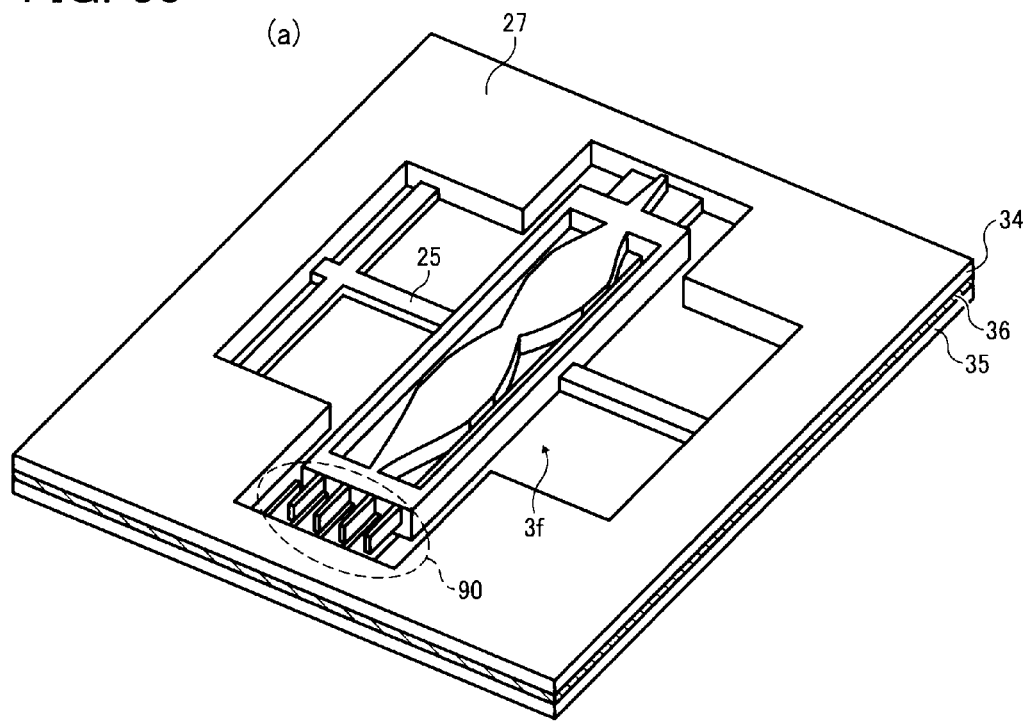
FIGS. 30A and 30B are schematic views illustrating another embodiment of the mirror substrate 3f of the present invention.
Figure 30:
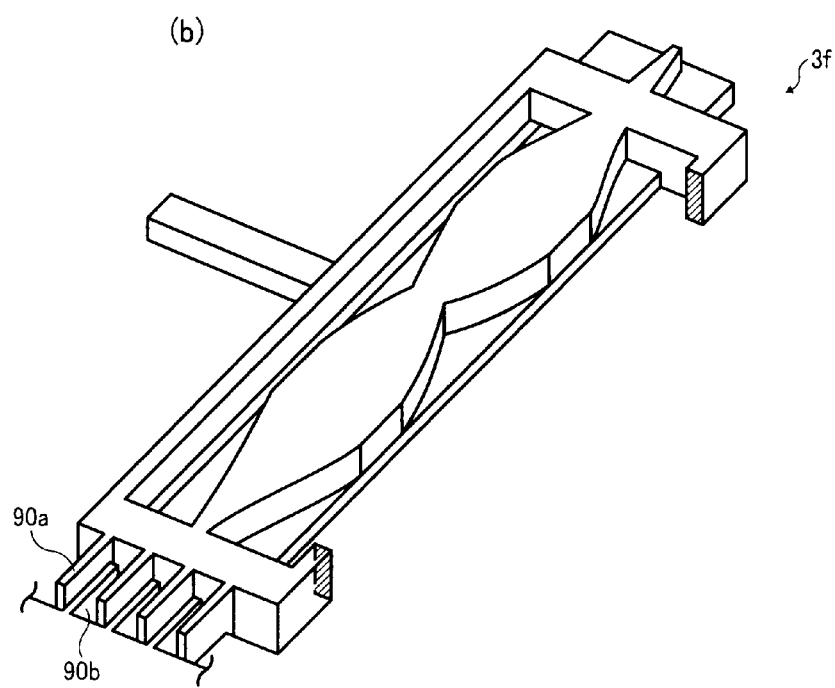

Each of the above-mentioned Examples uses a piezoelectric element for driving a mirror substrate, but the present invention is not limited thereto and, e.g., an electrostatic force can be used as a drive source. FIGS. 30A and 30B are schematic views illustrating another embodiment of the mirror substrate 3f of the present invention, in which an electrostatic comb-like structure is formed on both ends of the mirror substrate.

A comb-like electrode 90 is formed on a frame member 27 and both ends of a mirror substrate 3f. A comb-like electrode (fixed) 90b is formed on the frame 27 and a comb-like electrode (movable) 90a is formed on the mirror substrate 3f. A connection member on the backside of which a piezoelectric element is formed is not necessary.

A pulse or a sinusoidal voltage is applied between the fixed and movable comb-like electrodes to generate an electrostatic force therebetween. The mirror substrate 3f begins a rotational oscillation with the electrostatic force around the torsion spring in an arrow direction. The dynamic deformation is the same when a piezoelectric element is used.

Figure 29:
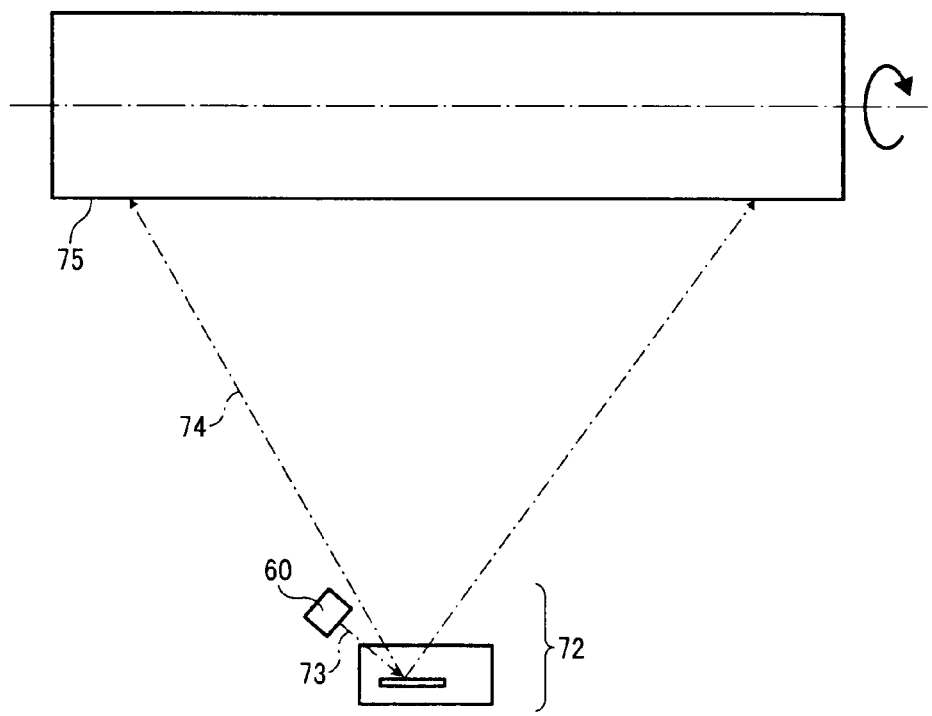
FIGS. 29A and 29B are a schematic views illustrating an image forming apparatus using the optical scanner of the present invention.
Figure 29:
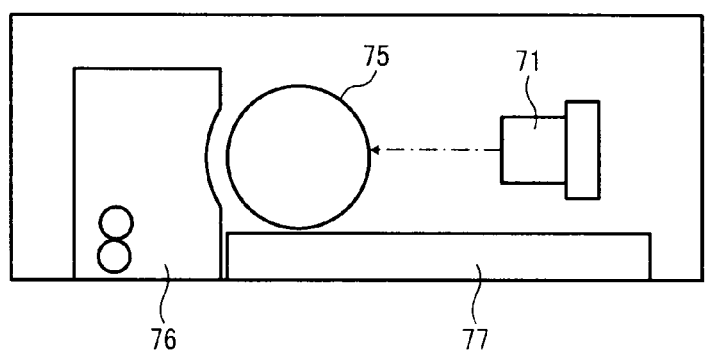

FIGS. 29A and 29B are a schematic views illustrating an image forming apparatus using the optical scanner of the present invention. FIG. 29A is a configuration in a main scanning direction and FIG. 29B is a lateral configuration. An optical writer 72 is an optical scanner having the configuration in FIG. 28.

Numeral 60 is a laser diode and emits light based on an image signal generated by an image signal generator (not shown). A laser beam 73 enters the optical scanner 72. A reflected laser beam 74 deflected by a mirror 70 of the optical scanner 72 forms an electrostatic latent image on a photoreceptor 75.

An image developer and fixer 76 develops the electrostatic latent image formed on the photoreceptor to form a toner image on a recording paper fed by a recording material feeder 77. The optical writer is formed of plural optical scanners 71 located in a main scanning direction. A laser printer typically uses a polygon scanner as an optical scanner. An optical writer formed of the optical scanners of the present invention has much less parts than the polygon scanner and the cost thereof can be expected to be low.

This application claims priority and contains subject matter related to Japanese Patent Applications Nos. 2009-063364 and 2009-273206, filed on Mar. 16, 2009 and Dec. 1, 2009, respectively, the entire contents of each of which are hereby incorporated by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An optical scanner, comprising:
   a frame member;
   a pair of elastic members; and
   a mirror substrate supported by the pair of elastic members and oscillatable back and forth around the pair of elastic members as a torsion rotational axis,
   wherein
   the pair of elastic members are connected with the frame member by a pair of connection members near a coupling end with the frame member,
   the pair of connection members include a piezoelectric element that generates a torque to drive the mirror substrate,
   the mirror substrate has a bending rigidity outward from the rotational axis for each area in accordance with a bending moment caused by oscillation and has a rectangular slit at both connection ends with the pair of elastic members,
   the rectangular slit extends close to both ends of the mirror substrate in a longitudinal direction thereof and maximizes a bending rigidity of an area including a position where a bending moment is maximum when the mirror substrate oscillates, and
   the mirror substrate includes a rib extending to an end of the mirror substrate in a longitudinal direction thereof on a backside opposite to a mirror surface thereof,
   wherein
   the rib width gradually widens in a direction from the rotational axis to the end of the mirror substrate in the longitudinal direction such that the rib width becomes maximum between the rotational axis and the end of the mirror substrate in the longitudinal direction, and
   the rib width gradually narrows in a direction from the position between the rotational axis and the end of the mirror substrate in the longitudinal direction where the rib width is maximum to the end of the mirror substrate in the longitudinal direction, and
   the rib width changes so that a ratio of a second moment of area of each area to a bending moment thereof is almost fixed.

2. The optical scanner of claim 1, wherein the mirror substrate comprises plural stepwise areas on a backside opposite to a mirror surface thereof and the plural stepwise areas change in width and thickness so that the ratio of the second moment of area of each area to the bending moment thereof is almost fixed.

3. The optical scanner of claim 1, wherein the mirror substrate comprises plural convexities formed of a rib and a bottom plate on a backside opposite to a mirror surface thereof and the number of rib changes so that the ratio of the second moment of area of each area to the bending moment thereof is almost fixed.

4. The optical scanner of claim 1, wherein the rectangular slit is almost triangular in shape.

5. The optical scanner of claim 1, wherein the rib comprises plural pairs of ribs extending in a longitudinal direction of the mirror substrate at both ends thereof in a shorter side direction thereof.

6. The optical scanner of claim 1, wherein the rib comprises plural ribs extending in a shorter side direction of the mirror substrate.

7. The optical scanner of claim 1, wherein the mirror substrate is an SOI substrate comprising a first silicon substrate and a second silicon substrate combined through an insulation film, and wherein the elastic member and the connection member are formed on the first silicon substrate, and the frame member, the mirror substrate and the rectangular slit are formed from the first silicon substrate through the second silicon substrate to form an oscillation space of the mirror substrate in a body.

8. An image forming apparatus, comprising:
a photoreceptor;
an electrostatic latent image former having an optical scanner configured to form an electrostatic latent image on the photoreceptor, the optical scanner including
a frame member,
a pair of elastic members, and
a mirror substrate supported by the pair of elastic members and oscillatable back and forth around the pair of elastic members as a torsion rotational axis,
wherein
the pair of elastic members are connected with the frame member by a pair of connection members near a coupling end with the frame member,
the pair of connection members include a piezoelectric element that generates a torque to drive the mirror substrate,
the mirror substrate has a bending rigidity outward from the rotational axis for each area in accordance with a bending moment caused by oscillation and has a rectangular slit at both connection ends with the pair of elastic members,
the rectangular slit extends close to both ends of the mirror substrate in a longitudinal direction thereof and maximizes a bending rigidity of an area including a position where a bending moment is maximum when the mirror substrate oscillates, and
the mirror substrate includes a rib extending to an end of the mirror substrate in a longitudinal direction thereof on a backside opposite to a mirror surface thereof,
wherein
the rib width gradually widens in a direction from the rotational axis to the end of the mirror substrate in the longitudinal direction such that the rib width becomes maximum between the rotational axis and the end of the mirror substrate in the longitudinal direction, and
the rib width gradually narrows in a direction from the position between the rotational axis and the end of the mirror substrate in the longitudinal direction where the rib width is maximum to the end of the mirror substrate in the longitudinal direction, and
the rib width changes so that a ratio of a second moment of area of each area to a bending moment thereof is almost fixed;
an image developer configured to develop the electrostatic latent image with a toner to from a toner image; and
a fixer configured to fix the toner image on a recoding material.

9. The image forming apparatus of claim 8, wherein the mirror substrate comprises plural stepwise areas on a backside opposite to a mirror surface thereof and the plural stepwise areas change in width and thickness so that the ratio of the second moment of area of each area to the bending moment thereof is almost fixed.

10. The image forming apparatus of claim 8, wherein the mirror substrate comprises plural convexities formed of a rib and a bottom plate on a backside opposite to a mirror surface thereof and the number of rib changes so that the ratio of the second moment of area of each area to the bending moment thereof is almost fixed.

11. The image forming apparatus of claim 8, wherein the rectangular slit is almost triangular in shape.

* * * * *